US012432676B2

(12) United States Patent
Yuan et al.

(10) Patent No.: US 12,432,676 B2
(45) Date of Patent: Sep. 30, 2025

(54) TIMING ADVANCE INDICATION FOR MULTI-PANEL UPLINK TRANSMISSION

(71) Applicant: QUALCOMM Incorporated, San Diego, CA (US)

(72) Inventors: Fang Yuan, Beijing (CN); Wooseok Nam, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/995,575

(22) PCT Filed: May 29, 2020

(86) PCT No.: PCT/CN2020/093453
§ 371 (c)(1),
(2) Date: Oct. 5, 2022

(87) PCT Pub. No.: WO2021/237712
PCT Pub. Date: Dec. 2, 2021

(65) Prior Publication Data
US 2023/0164719 A1 May 25, 2023

(51) Int. Cl.
*H04W 56/00* (2009.01)
(52) U.S. Cl.
CPC ................. *H04W 56/004* (2013.01)
(58) Field of Classification Search
CPC ........... H04W 56/004; H04W 56/0045
See application file for complete search history.

(56) References Cited

U.S. PATENT DOCUMENTS

2018/0242311 A1* 8/2018 Maeda ............... H04W 52/143
2020/0053752 A1   2/2020 Huang et al.

FOREIGN PATENT DOCUMENTS

CN    103037498 A    4/2013
CN    110391881 A    10/2019
(Continued)

OTHER PUBLICATIONS

Huawei, et al., "Discussion on Panel ID and Usage", 3GPP Draft, 3GPP TSG RAN WG1 Meeting #97, R1-1907553, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051728986, 5 Pages, Paragraph [2.2.1] -Paragraph [2.2.1], Sections 1-3.
(Continued)

Primary Examiner — Jamal Javaid
(74) Attorney, Agent, or Firm — Holland & Hart LLP

(57) ABSTRACT

Methods, systems, and devices for wireless communications are described. In some systems, a user equipment (UE) may communicate with a multiple transmission and reception points (TRPs) associated with a base station using multiple panels and each panel of the UE may be associated with a different timing advance value Signaling of multiple timing advance values from the base station to the UE may be associated with large overhead. In some implementations of the present disclosure, the base station and the UE may support methods and algorithms for deriving multiple timing advance values from a single timing advance value. For example, the base station may transmit a timing advance value to the UE and the UE may derive a timing advance value for each panel of the UE based on the received timing advance value and a timing of downlink signals received at each of the panels of the UE.

35 Claims, 14 Drawing Sheets

(56) References Cited

FOREIGN PATENT DOCUMENTS

| EP | 3783977 A1 | 2/2021 |
| --- | --- | --- |
| WO | WO-2020005586 A1 | 1/2020 |
| WO | WO-2020024295 A1 | 2/2020 |
| WO | WO-2020033901 | 2/2020 |
| WO | WO-2020086826 A1 | 4/2020 |
| WO | WO-2020103846 A1 | 5/2020 |

OTHER PUBLICATIONS

Huawei, et al., "Panel-Based UL Beam Selection", 3GPP Draft, 3GPP TSG RAN WG1 Meeting #96bis, R1-1903975, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051699388, 6 pages, section 4.1 section 4.2 section 1, Sections 1-4.

International Search Report and Written Opinion—PCT/CN2020/093453—ISA/EPO—Feb. 24, 2021.

LG Electronics: "Discussions on UL Reference Signals for NR Positioning", 3GPP TSG RAN WG1 #97, R1-1906720, Reno, USA, May 13-17, 2019, May 4, 2019 (May 4, 2019), 5 Pages, the Whole document, Sections 1-3.

Supplementary European Search Report—EP20937259—Search Authority—The Hague—Feb. 14, 2024.

\* cited by examiner

TIMING ADVANCE INDICATION FOR MULTI-PANEL UPLINK TRANSMISSION

CROSS REFERENCE

The present Application is a 371 national stage filing of International PCT Application No. PCT/CN2020/093453 by Yuan et al. entitled "TIMING ADVANCE INDICATION FOR MULTI-PANEL UPLINK TRANSMISSION," filed May 29, 2020, which is assigned to the assignee hereof, and which is expressly incorporated by reference in its entirety herein.

FIELD OF TECHNOLOGY

The following relates generally to wireless communications and more specifically to timing advance indication for multi-panel uplink transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may communicate with multiple transmission and reception points (TRPs). In order to support successful communications between multiple TRPs, the UE may receive additional signaling for each of the multiple TRPs. Such additional signaling may result in increased overhead and lower spectral efficiency.

SUMMARY

In some systems, a user equipment (UE) may support multi-panel communication with a base station and may communicate with the base station via multiple transmission and reception points (TRPs). In some cases, the UE may include multiple panels for communication to the base station, for example each panel communicating with a different TRP associated with the base station. In some cases, the UE may receive a timing advance value for each of the multiple TRPs, which may result in increased overhead and lower spectral efficiency. In the present disclosure, the described techniques relate to improved methods, systems, devices, and apparatuses that support a timing advance indication for multi-panel uplink transmission. Generally, the described techniques provide for receiving, at the UE, a single timing advance value and determining timing advance values for the multiple panels of the UE based on the single timing advance value and a timing of downlink signals received at the multiple panels of the UE. The UE may communicate with the base station via the multiple TRPs accordingly. In some examples, the received timing advance value may be a timing advance value for a reference panel of the UE and the UE may determine timing advance values for each of the remaining panels relative to the timing advance value for the reference panel. In some other implementations, the received timing advance value may be an average (e.g., a mean) of the timing advance value for the multiple panels of the UE and the UE may determine the timing advance value for each of the multiple panels relative to the average timing advance value.

A method of wireless communications at a UE is described. The method may include receiving, from a base station, a timing advance value for a serving cell configured for multi-panel communications, determining a first timing advance value for a first panel and a second timing advance value for a second panel based on the received timing advance value and a timing of at least one of a first downlink signal received via the first panel or a second downlink signal received via the second panel, and communicating with one or more TRPs associated with the base station based on the first timing advance value for the first panel and the second timing advance value for the second panel.

An apparatus for wireless communications at a UE is described. The apparatus may include a processor, memory coupled with the processor, and instructions stored in the memory. The instructions may be executable by the processor to cause the apparatus to receive, from a base station, a timing advance value for a serving cell configured for multi-panel communications, determine a first timing advance value for a first panel and a second timing advance value for a second panel based on the received timing advance value and a timing of at least one of a first downlink signal received via the first panel or a second downlink signal received via the second panel, and communicate with one or more TRPs associated with the base station based on the first timing advance value for the first panel and the second timing advance value for the second panel.

Another apparatus for wireless communications at a UE is described. The apparatus may include means for receiving, from a base station, a timing advance value for a serving cell configured for multi-panel communications, determining a first timing advance value for a first panel and a second timing advance value for a second panel based on the received timing advance value and a timing of at least one of a first downlink signal received via the first panel or a second downlink signal received via the second panel, and communicating with one or more TRPs associated with the base station based on the first timing advance value for the first panel and the second timing advance value for the second panel.

A non-transitory computer-readable medium storing code for wireless communications at a UE is described. The code may include instructions executable by a processor to receive, from a base station, a timing advance value for a serving cell configured for multi-panel communications, determine a first timing advance value for a first panel and a second timing advance value for a second panel based on the received timing advance value and a timing of at least one of a first downlink signal received via the first panel or a second downlink signal received via the second panel, and communicate with one or more TRPs associated with the base station based on the first timing advance value for the first panel and the second timing advance value for the second panel.

Some examples of the method, apparatuses, and non-transitory computer-readable medium described herein may further include operations, features, means, or instructions for determining that the first panel may be a reference panel, where applying the timing advance value to the first panel may be based on determining that the first panel may be the reference panel.

Some examples of the method, apparatuses, and non-transitory computer-readable medium described herein may further include operations, features, means, or instructions for receiving, from the base station, an indication that the first panel may be the reference panel.

In some examples of the method, apparatuses, and non-transitory computer-readable medium described herein, the indication is received via at least one of radio resource control (RRC) signaling, a medium access control (MAC) control element (CE), or downlink control information (DCI).

In some examples of the method, apparatuses, and non-transitory computer-readable medium described herein, the first panel is associated with a first panel identifier (ID) lower than a second panel ID associated with the second panel, where determining that the first panel is the reference panel is based on the first panel ID being lower than the second panel ID.

Some examples of the method, apparatuses, and non-transitory computer-readable medium described herein may further include operations, features, means, or instructions for receiving the first downlink signal via the first panel after receiving the second downlink signal via the second panel, where determining that the first panel may be the reference panel may be based on receiving the first downlink signal via the first panel after receiving the second downlink signal via the second panel.

Some examples of the method, apparatuses, and non-transitory computer-readable medium described herein may further include operations, features, means, or instructions for receiving the first downlink signal via the first panel prior to receiving the second downlink signal via the second panel, where determining that the first panel may be the reference panel may be based on receiving the first downlink signal via the first panel prior to receiving the second downlink signal via the second panel.

In some examples of the method, apparatuses, and non-transitory computer-readable medium described herein, determining the second timing advance value for the second panel may include operations, features, means, or instructions for determining an offset based on a difference between when the first downlink signal may be received by the first panel and when the second downlink signal may be received by the second panel, and determining the second timing advance value for the second panel based on the received timing advance value and the offset.

In some examples of the method, apparatuses, and non-transitory computer-readable medium described herein, determining the first timing advance value for the first panel and the second timing advance value for the second panel may include operations, features, means, or instructions for determining a first offset and a second offset based on a difference between when the first downlink signal may be received by the first panel and when the second downlink signal may be received by the second panel, determining the first timing advance value for the first panel based on the received timing advance value and the first offset, and determining the second timing advance value for the second panel based on the received timing advance value and the second offset.

In some examples of the method, apparatuses, and non-transitory computer-readable medium described herein, determining the first offset and the second offset may include operations, features, means, or instructions for determining the first offset based on a first difference between when the first downlink signal may be received by the first panel and when the second downlink signal may be received by the second panel, and determining the second offset based on a second difference between when the first downlink signal may be received by the first panel and when the second downlink signal may be received by the second panel.

A method of wireless communications at a base station is described. The method may include receiving, from a UE, one or more transmissions from at least one of multiple panels of the UE, determining a timing advance value for a serving cell configured for multi-panel communications based at least in part the received one or more transmissions and a reference timing configuration for the serving cell for the UE, transmitting, to the UE, the timing advance value, and communicating with the UE via one or more TRPs associated with the base station.

An apparatus for wireless communications at a base station is described. The apparatus may include a processor, memory coupled with the processor, and instructions stored in the memory. The instructions may be executable by the processor to cause the apparatus to receive, from a UE, one or more transmissions from at least one of multiple panels of the UE, determine a timing advance value for a serving cell configured for multi-panel communications based at least in part the received one or more transmissions and a reference timing configuration for the serving cell for the UE, transmit, to the UE, the timing advance value, and communicate with the UE via one or more TRPs associated with the base station.

Another apparatus for wireless communications at a base station is described. The apparatus may include means for receiving, from a UE, one or more transmissions from at least one of multiple panels of the UE, determining a timing advance value for a serving cell configured for multi-panel communications based at least in part the received one or more transmissions and a reference timing configuration for the serving cell for the UE, transmitting, to the UE, the timing advance value, and communicating with the UE via one or more TRPs associated with the base station.

A non-transitory computer-readable medium storing code for wireless communications at a base station is described. The code may include instructions executable by a processor to receive, from a UE, one or more transmissions from at least one of multiple panels of the UE, determine a timing advance value for a serving cell configured for multi-panel communications based at least in part the received one or more transmissions and a reference timing configuration for the serving cell for the UE, transmit, to the UE, the timing advance value, and communicate with the UE via one or more TRPs associated with the base station.

Some examples of the method, apparatuses, and non-transitory computer-readable medium described herein may further include operations, features, means, or instructions for determining that the first panel may be a reference panel based on the reference timing configuration, where the transmitted timing advance value may be equal to the first timing advance value for the first panel based on determining that the first panel may be the reference panel.

Some examples of the method, apparatuses, and non-transitory computer-readable medium described herein may further include operations, features, means, or instructions for transmitting, to the UE, an indication that the first panel may be the reference panel.

In some examples of the method, apparatuses, and non-transitory computer-readable medium described herein, the indication is transmitted via at least one of RRC signaling, a MAC-CE, or DCI.

In some examples of the method, apparatuses, and non-transitory computer-readable medium described herein, the first panel is associated with a first panel ID lower than a second panel ID associated with the second panel, where determining that the first panel is the reference panel is based on the first panel being associated with the first panel ID lower than the second panel ID associated with the second panel.

Some examples of the method, apparatuses, and non-transitory computer-readable medium described herein may further include operations, features, means, or instructions for determining that the first panel may be associated with a larger timing advance value than the second panel, where determining that the first panel may be the reference panel may be based on determining that the first panel may be associated with the larger timing advance.

Some examples of the method, apparatuses, and non-transitory computer-readable medium described herein may further include operations, features, means, or instructions for determining that the first panel may be associated with a smaller timing advance value than the second panel, where determining that the first panel may be the reference panel may be based on determining that the first panel may be associated with the smaller timing advance.

In some examples of the method, apparatuses, and non-transitory computer-readable medium described herein, the transmitted timing advance value is based on an average of the first timing advance value for the first panel and the second timing advance value for the second panel.

DETAILED DESCRIPTION

Figure 1:
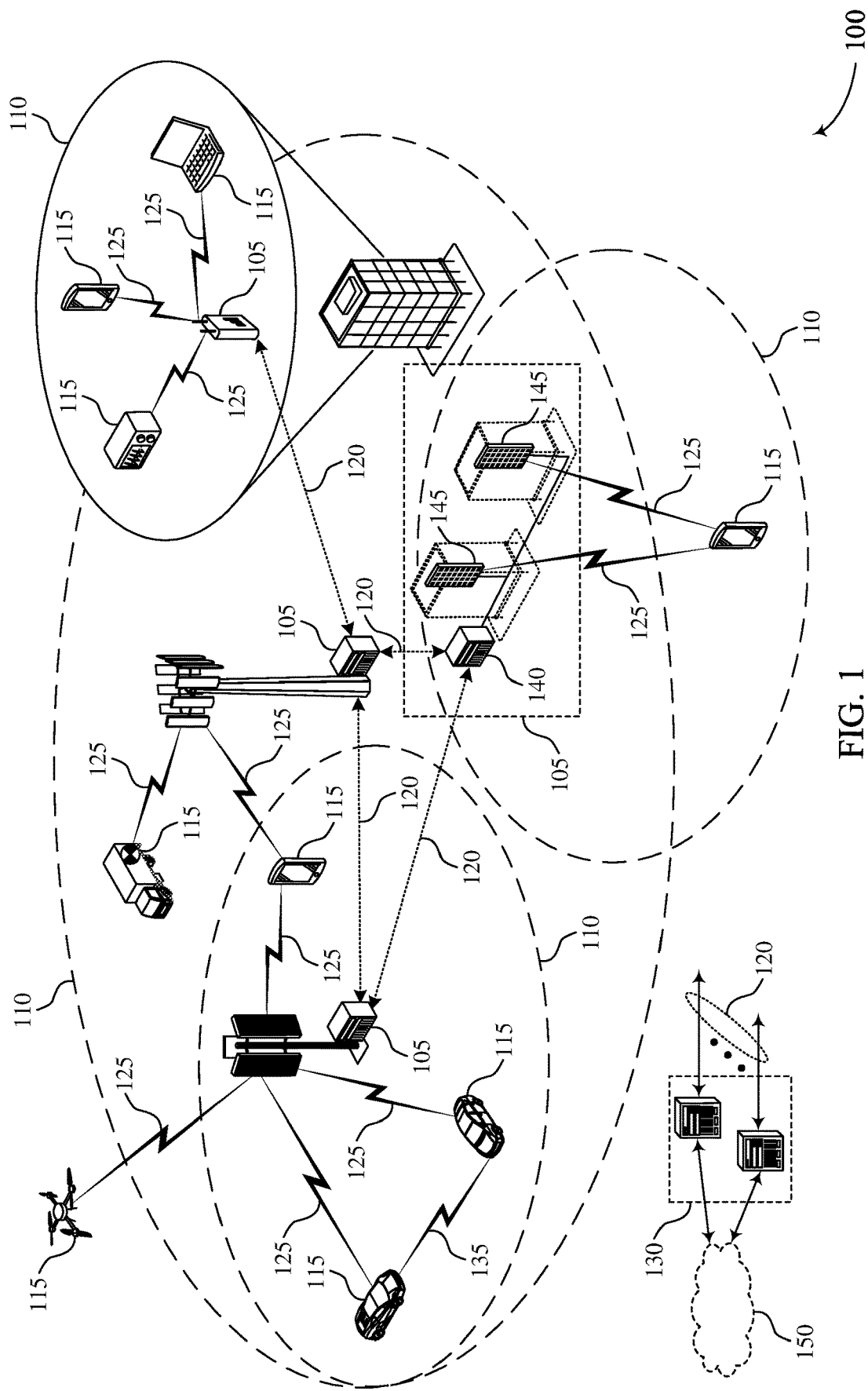
FIG. 1 illustrates an example of a wireless communications system that supports timing advance indication for multi-panel uplink transmission in accordance with aspects of the present disclosure.

In some wireless communications systems, a user equipment (UE) may support multi-panel communication with a base station via multiple transmission and reception points (TRPs). In some cases, for example, the UE may communicate with the base station via multiple TRPs by communicating with each TRP using a different panel of the UE. For instance, the UE may communicate with a first TRP associated with the base station using a first panel and may communicate with a second TRP associated with the base station using a second panel. To increase the likelihood for successful communications between the UE and the multiple TRPs associated with the base station, the UE may adjust the timing of uplink transmissions from the UE such that uplink transmissions from the UE are received by each TRP aligned with a downlink frame at the TRP. The UE may adjust the timing of an uplink transmission to a TRP by applying a timing advance (e.g., a timing advance value) to the uplink transmission. The timing advance value that the UE may apply to uplink transmissions may be based on the receiving TRP. For example, the first TRP and the second TRP may be associated with different timing advance values. In some cases, the base station, via one or more TRPs, may signal the multiple timing advance values that the UE may use to communicate with the TRPs associated with the base station.

According to aspects of the present disclosure, the base station, via one or more TRPs, may signal a timing advance value (e.g., a single timing advance value) that the UE may use to determine a timing advance value for each panel of the UE that the UE uses to communicate with a TRP associated with the base station. For example, the UE may use the received timing advance value to determine a first timing advance value that the UE may use for uplink transmissions from the first panel of the UE to the first TRP and to determine a second timing advance value that the UE may use for uplink transmissions from the second panel of the UE to the second TRP. In some examples, the UE may use the received timing advance value and a timing of a number of downlink signals (e.g., a number of multi-panel downlink receptions) to determine the timing advance values for each panel of the UE. In such examples, the UE may determine the timing advance value for one or more panels of the UE based on determining an offset from the received timing advance value. In some implementations, the UE may determine the offset based on measuring a time duration between downlink signals received at each of the panels of the UE.

Particular aspects of the subject matter described herein may be implemented to realize one or more potential advantages. The described techniques may support efficient signaling of timing advance values that a UE may use to communicate with multiple TRPs via multiple panels of the UE. Accordingly, the UE and the base station may reduce signaling overhead and improve spectral efficiency while maintaining the high reliability, coverage, and capacity associated with communicating via multiple TRPs. Further, based on receiving fewer timing advance values (e.g., based on receiving a single timing advance value instead of a timing advance value for each panel of the UE), the UE may monitor fewer resources for signaling from the base station and, as such, may power off one or more components to achieve greater power savings and longer battery life. Likewise, the base station, via the multiple TRPs, may perform fewer transmissions and, as such, may similarly achieve greater power savings as well as decrease interference in the system.

Aspects of the disclosure are initially described in the context of wireless communications systems. Aspects of the disclosure are additionally described in the context of communication timelines and a process flow. Aspects of the disclosure are further illustrated by and described with reference to apparatus diagrams, system diagrams, and flowcharts that relate to timing advance indication for multi-panel uplink transmission.

FIG. 1 illustrates an example of a wireless communications system 100 that supports timing advance indication for multi-panel uplink transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may be associated with multiple TRPs and a UE 115 may communicate with the base station 105 via the multiple TRPs. The UE 115 may support multi-panel communication and may communicate with each of the multiple TRPs using a different panel of the UE 115. A panel of the UE 115 may refer to an antenna configuration of the UE 115 and, as such, may equivalently be referred to as an antenna panel. A group of antenna elements, which may include two or more antenna elements in one or more antenna arrays or sub-arrays may be referred to herein as an antenna panel, which may correspond to a physical antenna panel or hardware module at a UE or to a virtual antenna panel that may include two or more antenna elements that are a subset of antenna elements at a physical antenna module or that span multiple antenna modules. Each antenna panel may include antenna elements associated with one or more polarizations. In some cases, an antenna panel may include beamforming capability (e.g., analog beamforming components such as phase shifters or configurable amplifiers). In some cases, each antenna panel may be associated with one or more radio frequency chains, which may, for example, convert between radio frequency signals and digital baseband signals.

TRPs that are associated with the base station 105 may include or otherwise refer to TRPs located at the same physical location as the base station 105 (e.g., TRPs that are a part of the base station 105) or TRPs located at various physical locations that the base station 105 may use to communicate with the UE 115 (e.g., such as a relay node). Alternatively, a TRP may refer to the base station 105 and, in such cases, the UE 115 may communicate with multiple base stations 105.

In some implementations of the present disclosure, the base station 105 may receive one or more transmissions from the UE 115 and may measure or otherwise determine a timing advance value for each panel of the UE 115 that the UE 115 uses to communicate with the multiple TRPs associated with the base station 105. The base station 105 may determine a timing advance value (e.g., a single timing advance value) based on the measured timing advance values for each panel of the UE 115 and may transmit the timing advance value (e.g., the single timing advance value) to the UE 115. The UE 115 may use the received timing advance value and a timing of at least one downlink signal received via at least one of the multiple panels of the UE 115 to derive or otherwise determine a timing advance value for each panel of the UE 115. Accordingly, the UE 115 may apply the derived timing advance values for each panel of the UE 115 to communicate with the base station 105 via the multiple TRPs associated with the base station 105.

Figure 2:
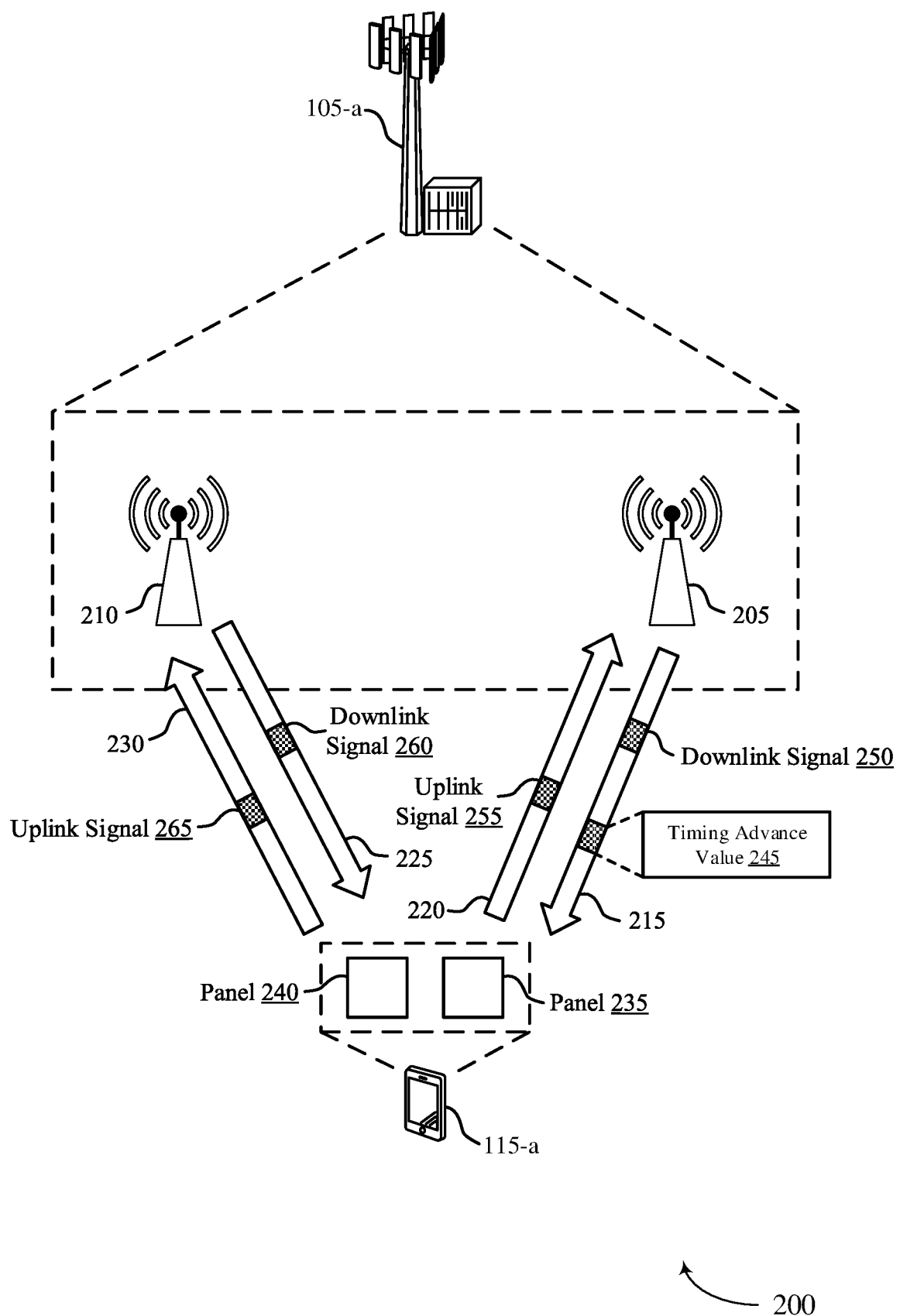
FIG. 2 illustrates an example of a wireless communications system that supports timing advance indication for multi-panel uplink transmission in accordance with aspects of the present disclosure.

FIG. 2 illustrates an example of a wireless communications system 200 that supports timing advance indication for multi-panel uplink transmission in accordance with aspects of the present disclosure. In some examples, the wireless communications system 200 may implement aspects of the wireless communications system 100.

The wireless communications system 200 may include a base station 105-*a* and a UE 115-*a*, which may be examples of corresponding devices as described herein. The base station 105-*a* may be associated with a TRP 205 and a TRP 210, which may be physically located at the base station 105-*a* or at a location remote from the base station 105-*a*, and usable by the base station 105-*a* to communicate with the UE 115-*a*. The UE 115-*a* may communicate with the TRP 205 and the TRP 210 using a panel 235 and a panel 240, respectively. For example, the UE 115-*a* may use the panel 235 to transmit uplink signals 255 over an uplink communication link 220 to the TRP 205 and to receive downlink signals 250 over a downlink communication link 215 from the TRP 205. Similarly, the UE 115-*a* may use the panel 240 to transmit uplink signals 265 over an uplink communication link 230 to the TRP 210 and to receive downlink signals 260 over a downlink communication link 225 from the TRP 210. In some examples, the UE 115-*a* may receive a timing advance value 245 from the base station 105-*a* (e.g., via the TRP 210, as shown, via the TRP 205, or via any other signaling) and the UE 115-*a* may use the timing advance value 245 to determine a timing advance value for communications from each of the panel 235 and the panel 240.

The base station 105-*a* may host a serving cell for the UE 115-*a* and, accordingly, may be referred to herein as a serving base station 105-*a*. The UE 115-*a* may be configured to support multi-panel uplink communication with the base station 105-*a* and may communicate with the TRP 205 and the TRP 210 associated with the base station 105-*a* using different panels of the UE 115-*a*, such as the panel 235 and the panel 240, respectively. In some cases, TRP 205 and TRP 210 may be synchronized with the downlink timing of the base station 105-*a* (e.g., transmitting and receiving signals according to a synchronized frame timing). In such cases, the base station 105-*a* may transmit a timing advance value 245 to the UE 115-*a* for each of the panel 235 and the panel 240 to better align signals transmitted by the UE 115-*a* with the downlink timing at the base station 105-*a* when received by the TRP 205 or TRP 210. For example, communication between the TRP 205 and the panel 235 may be associated with a first timing advance group (TAG) (e.g., a first TAG-ID) and the base station 105-*a* may signal a first timing advance value for the UE 115-*a* to apply to communication between the TRP 205 and the panel 235. Similarly, communication between the TRP 210 and the panel 240 may be associated with a second TAG (e.g., a second TAG-ID) and the base station 105-*a* may signal a second timing advance value for the UE 115-*a* to apply to communication between the TRP 210 and the panel 240. For example, the TRP 205 and the TRP 210 may be at different locations (e.g., physically separate from the base station 105-*a*) or communication between the TRP 205 and the UE 115-*a* may take a different duration of time than communication between the TRP 210 and the UE 115-*a* for other reasons (e.g., different channel paths, reflections).

In some cases, the TRP 205 and the TRP 210 may be synchronized (e.g., timing-aligned) such that the TRP 205 and the TRP 210 may have aligned uplink frames and downlink frames. For example, the beginning of a downlink frame of the TRP 205 may be aligned with the beginning of a downlink frame of the TRP 210. Based on being located at different locations and having alignment in time, the timing advance value that the UE 115-*a* may use to communicate with each of the TRP 205 and the TRP 210 may be different. In such examples, the UE 115-*a* may adjust the timing of a first uplink transmission (e.g., an uplink signal 255) from the panel 235 to the TRP 205 by the first timing advance value and may adjust the timing of a second transmission (e.g., an uplink signal 265) from the panel 240 to the TRP 210 by the second timing advance value, which may result in better alignment of the reception of the uplink signal 255 at the TRP 205 and a downlink frame of the TRP 205 and better alignment of the reception of the uplink signal 265 at the TRP 210 and a downlink frame of the TRP 210. In some cases, however, signaling a different timing advance value for each TRP associated with the base station 105-*a* (e.g., for each panel of the UE 115-*a* that the UE 115-*a* uses to communicate with a TRP associated with the base station 105-*a*) may result in an increase in signaling overhead and may reduce the spectral efficiency and the achievable data rate of the wireless communications system 200.

In some implementations of the present disclosure, the base station 105-*a* may signal a timing advance value 245

(e.g., a single timing advance value 245) that the UE 115-*a* may use to determine timing advance values for the panel 235 and the panel 240. In some aspects, the timing advance value 245 may be associated with a TAG-ID (e.g., the UE 115-*a* may be associated with a single TAG). In such implementations, the base station 105-*a* may transmit fewer signals to the UE 115-*a*, reducing overhead and improving spectral efficiency. In some examples, the base station 105-*a* may determine the timing advance for each of the panel 235 and the panel 240 based on determining the difference (e.g., the time-domain difference) between when a transmission from the UE 115-*a* is received and the start of a downlink frame at the base station 105-*a* (which may be equivalent to the start of a downlink frame at both of the TRP 205 and the TRP 210 in the case that the TRP 205 and the TRP 210 are timing-aligned). For example, the base station 105-*a* may measure the difference between when the base station 105-*a* (e.g., via the TRP 205) receives an uplink signal 255 and the beginning of a downlink frame at the base station 105-*a* to determine a first timing advance value for the panel 235. Similarly, the base station 105-*a* may measure the difference between when the base station 105-*a* (e.g., via the TRP 210) receives an uplink signal 265 and the beginning of a downlink frame at the base station 105-*a* to determine a second timing advance value for the panel 240.

The base station 105-*a* may use the first timing advance value for the panel 235 and the second timing advance value for the panel 240 to determine the timing advance value 245 that the base station 105-*a* may transmit to the UE 115-*a*. In some examples, the base station 105-*a* may determine the timing advance value 245 based on the first timing advance value, the second timing advance value, and a reference timing configuration for the serving cell (e.g., for the serving base station 105-*a*). The reference timing configuration may indicate how the base station 105-*a* may determine the timing advance value 245. For example, in some implementations, the reference timing configuration may indicate that the base station 105-*a* may determine the timing advance value 245 based on equating the timing advance value 245 to the timing advance value of a reference or a default panel (e.g., either the first timing advance value for the panel 235 or the second timing advance value for the panel 240). For instance, in the case that the panel 235 is the reference panel, the timing advance value 245 may equal the first timing advance value that the base station 105-*a* measures for communication between the TRP 205 and the panel 235 of the UE 115-*a*. In some other implementations, the reference timing configuration may indicate that the base station 105-*a* may determine the timing advance value 245 based on the mean (e.g., the average) of the first timing advance value and the second timing advance value. For example, the base station 105-*a* may average the first timing advance value and the second timing advance value and may set the timing advance value 245 equal to the average. In some aspects, the reference timing configuration may be configured at both the base station 105-*a* and the UE 115-*a* (e.g., pre-configured or signaled).

The UE 115-*a* may receive the timing advance value 245 and determine the first timing advance value for the panel 235 and the second timing advance value for the panel 240 based on the received timing advance value 245 and a timing of at least one of the downlink signal 250 or the downlink signal 260 received via the panel 235 or the panel 240, respectively. In some examples, the UE 115-*a* may determine the first timing advance value for the panel 235 and the second panel 240 based on the reference timing configuration. For example, the method, technique, algorithm, or process for determining the first timing advance value and the second timing advance value may be based on whether the timing advance value 245 is equal to a timing advance value for a reference panel (e.g., the first timing advance value for the panel 235 or the second timing advance value for the panel 240) or equal to an average of the first timing advance value for the panel 235 and the second timing advance value for the panel 240. Additional details relating to determining the first timing advance value for the panel 235 and the second timing advance value for the panel 240 are described herein, including with reference to FIG. 3.

Accordingly, the UE 115-*a* may communicate with the TRP 205 and the TRP 210 associated with the base station 105-*a* based on the first timing advance value for the panel 235 and the second timing advance value for the panel 240. For example, the UE 115-*a* may apply the first timing advance value to communication (e.g., uplink signals 255) between the TRP 205 and the panel 235 and may apply the second timing advance value to communication (e.g., uplink signals 265) between the TRP 210 and the panel 240.

Figure 3:
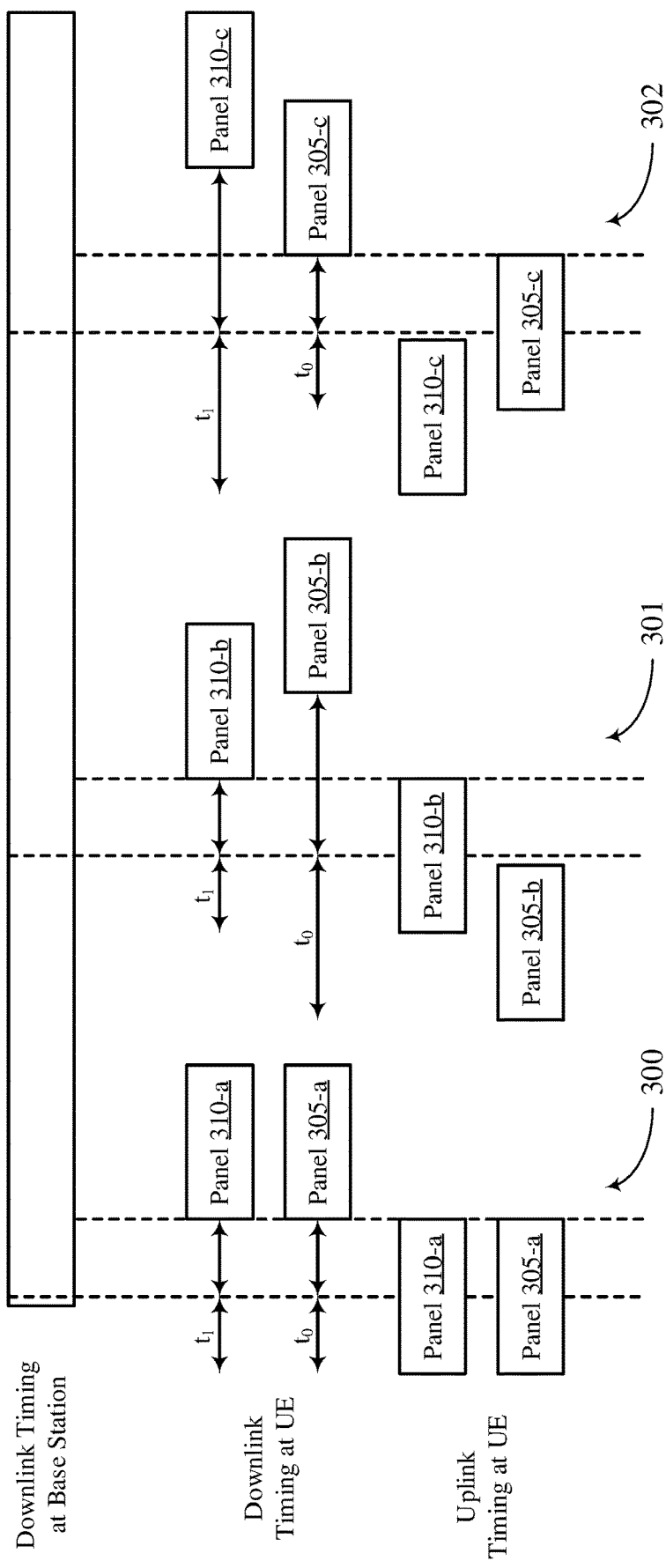
FIG. 3 illustrates example communications timelines that support timing advance indication for multi-panel uplink transmission in accordance with aspects of the present disclosure.

FIG. 3 illustrates example communication timelines 300, 301, and 302 that support timing advance indication for multi-panel uplink transmission in accordance with aspects of the present disclosure. In some examples, the communication timelines 300, 301, and 302 may implement aspects of the wireless communications system 100 and the wireless communications system 300. The communications timelines 300, 301, and 302 may illustrate communication between multiple TRPs associated with a base station and a UE, which may be examples of corresponding devices described herein. In some examples, the UE may determine a timing advance value for multiple panels, such as a panel 305 and a panel 310, based on receiving a timing advance value (e.g., a single timing advance value) from the base station.

In some cases, the UE may communicate with a first TRP associated with the base station via the panel 305 and may communicate with a second TRP associated with the base station via the panel 310. In some implementations, the base station may determine the timing advance value based on determining a first timing advance value for communication between the first TRP and the panel 305 of the UE (which may be referred to herein as $2*t_0$), a second timing advance value for communication between the second TRP and the panel 310 of the UE (which may be referred to herein as $2*t_1$), and a reference timing configuration, as described in more detail herein, including with reference to FIG. 2. In some examples, the reference timing configuration may indicate that the base station will set the transmitted timing advance value equal to the timing advance value for a reference panel of the UE. The reference panel of the UE may be either the panel 305 or the panel 310 based on the configuration. In some other examples, the reference timing configuration may indicate that the base station will set the transmitted timing advance value equal to an average of the first timing advance value for the panel 305 and the second timing advance value for the panel 310.

In some examples in which the reference timing configuration indicates that the transmitted timing advance value is equal to the timing advance value for a reference panel, the base station and the UE may determine the reference panel based on the configuration or based on signaling. For example, in some implementations, the base station may determine the reference panel and may signal an indication of the reference panel to the UE. The base station may signal the reference panel to the UE via radio resource control (RRC) signaling, a medium access control (MAC) control element (CE), or an indication in downlink control information (DCI). In such implementations, the base station may semi-statically or dynamically update which panel of the UE is the reference panel. In some other implementations, the base station and the UE may determine the reference panel based on a fixed rule. For example, the reference panel may be determined based on a panel identifier (ID) associated with each panel of the UE. For instance, the base station and the UE may determine that the panel with the lowest panel ID is the reference panel. In some aspects, the panel ID may be reused from or associated with other signal IDs, such as a sounding reference signal (SRS) resource ID, an SRS set ID, a CORESET pool index, or a beam ID, among other examples. Although described and illustrated in an example in which the reference panel is the panel with the lowest panel ID, the described techniques may be equivalently applied to an example in which the reference panel is the panel with the highest panel ID. In some other examples, the reference panel may be defined based on the relative timing advance value for each panel. For example, the base station and the UE may determine that the panel with the relatively smaller or larger timing advance value is the reference panel.

In such examples in which the timing advance value transmitted by the base station is equal to the timing advance value for a reference panel, the UE may apply the received timing advance value to the reference panel (e.g., apply the received timing advance value to communication from the reference panel) and derive the timing advance for the other panel. In some examples in which the reference timing configuration indicates that the transmitted timing advance value is equal to the average of the first timing advance value and the second timing advance value, the UE may derive the timing advance value for each panel of the UE. Examples of some implementations of the present disclosure are described with reference communication timelines 300, 301, and 302 and similar methods and algorithms may be used in addition, or in an alternative, to the example methods and algorithms described herein. Further, as described herein, $N_{TAi}$ is to the total timing advance value for a panel i of the UE 115-a and may be defined as shown below in Equation 1.

$$N_{TAi}=N_{TA}+TA+\delta_i \quad (1)$$

As shown in Equation 1, $N_{TA}$ is the the cumulative timing advance for a panel (e.g., based on a summation of previous timing advance values received from the base station), TA is the timing advance value received from the base station, and $\delta_i$ is an offset (e.g., in the time domain) for a panel i of the UE based on a timing of downlink signals received at the panels of the UE. In some cases, for example, the first timing advance value for the panel 305 may equivalently be defined as $2*t_0=TA+\delta_0$ and the second timing advance value for the panel 310 may be defined as $2*t_1=TA+\delta_1$.

As illustrated by communications timeline 300, the UE may transmit an uplink signal from each of the panel 305-a and the panel 310-a during the same time period and may receive a downlink signal via each of the panel 305-a and the panel 310-a during the same time period. In such cases, the timing advance value transmitted by the base station will apply to communications from the panel 305-a and the panel 310-a equally regardless of which panel is the reference panel. For example, the timing advance value for the panel 305-a and the panel 310-a is the same (e.g., $t_0=t_1$). As such, the first timing advance value for the panel 305-a may be equal to TA (e.g., $\delta_0=0$) and the total timing advance value for the panel 305-a may be determined based on $N_{TA0}=N_{TA}+TA$. Likewise, the second timing advance value for the panel 310-a may be equal to TA (e.g., $\delta_1=0$) and the total timing advance value for the panel 310-a may be determined based on $N_{TA1}=N_{TA}+TA$.

As illustrated by communications timeline 301, the UE may transmit an uplink signal from the panel 305-b prior to transmitting an uplink signal from the panel 310-b and may receive a downlink signal via the panel 310-b prior to receiving a downlink signal via the panel 305-b. Accordingly, the first timing advance value $2*t_0$ may be different than the second timing advance value $2*t_1$ (e.g., $t_0>t_1$) and, as such, the algorithms or methods that the UE may use to determine the first timing advance value and the second timing advance value may be based on the reference timing configuration used by the base station to determine the transmitted timing advance value.

In examples in which the timing advance value received by the UE is equal to the timing advance value of a reference panel and the reference panel is determined based on which panel receives a downlink signal first (e.g., which may be equivalent to which panel has the relatively smaller timing advance value), the base station and the UE may determine that the panel 310-b is the reference panel. For example, the UE may measure a first set of synchronization signal blocks (SSBs) which are associated with a first TRP of the base station using the panel 305-b and may measure a second set of SSBs which are associated with a second TRP of the base station using the panel 310-b. The first set of SSBs and the second set of SSBs may be transmitted from the first TRP of the base station and the second TRP of the base station, respectively. Based on the measurement, the UE may determine which panel receives a downlink signal first (e.g., the panel 310-b may receive the second set of SSBs before the panel 305-b receives the first set of SSBs). For example, the received timing advance value TA may be equal to $2*t_1$ and the UE may determine that the second timing advance value for the panel 310-b is equal to $2*t_1$ (e.g., the UE may determine that $\delta_1=0$ based on determining that the panel 310-b is the reference panel). As such, the UE may determine the second timing advance value for the panel 310-b based on determining $N_{TA1}=N_{TA}+TA$.

The UE may determine (e.g., derive) the first timing advance value for the panel 305-b based on the received timing advance value and a timing of the downlink signals received via the panel 305-b and the panel 310-b. In some examples, the UE may determine the offset $\delta_0$ between when a downlink signal is received via the panel 305-b and when a downlink signal is received via the panel 310-b. In some aspects, the UE may measure the offset between two downlink signals received at different panels of the UE that were transmitted from different TRPs associated with the base station at the same time (e.g., to achieve an accurate measure of the difference in timing advance between communications between the first TRP and the panel 305-b and communications between the second TRP and the panel 310-b). In some implementations, the UE may determine the offset $\delta_0$ to be equal to $2*(t_0-t_1)$. For instance, $\delta_0=2*(t_0-t_1)$. Accordingly, the UE may determine the total timing advance value for the panel 305-b based on determining $N_{TA0}=N_{TA}TA+\delta_0$.

In examples in which the timing advance value received by the UE is equal to the timing advance value of a reference panel and the reference panel is determined based on which panel has the lower panel ID, the base station and the UE may determine that the panel 305-b is the reference panel (e.g., the panel 305-b may be associated with a lower panel ID than the panel 310-b). For example, the received timing advance value TA may be equal to $2*t_0$ and the UE may determine that the first timing advance value for the panel 305-b is equal to 2*$t_0$ (e.g., the UE may determine that $\delta_0$=0 based on determining that the panel 305-b is the reference panel). As such, the UE may determine the first timing advance value for the panel 305-b based on determining $N_{TA0}$=$N_{TA}$+TA.

The UE may determine (e.g., derive) the second timing advance value for the panel 310-b based on the received timing advance value and the timing of the downlink signals received via the panel 305-b and the panel 310-b. For example, the UE may determine the offset $\delta_1$ between when a downlink signal is received via the panel 305-b and when a downlink signal is received via the panel 310-b. In some aspects, the UE may measure the offset between two downlink signals received at different panels of the UE that were transmitted from different TRPs associated with the base station at the same time. In some implementations, the UE may determine the offset $\delta_1$ to be proportional with the time difference of receiving the two downlink signals received at different panels of the UE that were transmitted from different TRPs associated with the base station at the same time. For instance, $\delta_1$=2*($t_0$−$t_1$). Accordingly, the UE may determine the total timing advance value for the panel 310-b based on determining $N_{TA1}$=$N_{TA}$+TA−$\delta_1$.

In examples in which the received timing advance value is equal to an average of the first timing advance value for the panel 305-b and the second timing advance value for the panel 310-b (e.g., TA=(2*$t_0$+2*$t_1$)/2=$t_0$+$t_1$), the UE may derive both the first timing advance value and the second timing advance value. For example, the UE may determine a first offset $\delta_0$ for the panel 305-b and a second offset $\delta_1$ for the panel 310-b. In some examples, the UE may determine the first offset $\delta_0$ based on a first difference between when a first downlink signal is received via the panel 305-b and when a second downlink signal is received via the panel 310-b and may determine the second offset $\delta_1$ based on a second difference between when the first downlink signal is received via the panel 305-b and when the second downlink signal is received via the panel 310-b. In some aspects, for example, the first difference may be proportional with the time difference between receiving the first downlink signal at panel 305-b of the UE and receiving the second downlink signal at panel 310-b of the UE that were transmitted from different TRPs associated with the base station at the same time. For example, the second difference may be proportional with the time difference between receiving the second downlink signal at panel 310-b of the UE and receiving the first downlink signal at panel 305-b of the UE that were transmitted by different TRPs associated with the base station at the same time. For instance, $\delta_0$=$t_0$−$t_1$ and $\delta_1$=$t_1$−$t_0$. The UE may determine the first timing advance value for panel 305-b based on the received timing advance value and the first offset and may determine the second timing advance value for panel 310-b based on the received timing advance value and the second offset. For example, the first timing advance value may be equal to TA+$\delta_0$ and the second timing advance value may be equal to TA+$\delta_1$. Accordingly, the UE may determine the total timing advance value for the panel 305-b based on determining $N_{TA0}$=$N_{TA}$+TA+$\delta_0$ and may determine the total timing advance value for the panel 310-b based on determining $N_{TA1}$=$N_{TA}$TA+$\delta_1$.

As illustrated by communications timeline 302, the UE may transmit an uplink signal from the panel 310-c prior to transmitting an uplink signal from the panel 305-c and may receive a downlink signal via the panel 305-c prior to receiving a downlink signal via the panel 310-c. Accordingly, the first timing advance value 2*$t_0$ may be different than the second timing advance value 2*$t_1$ (e.g., $t_1$>$t_0$) and, as such, the algorithms or methods that the UE may use to determine the first timing advance value and the second timing advance value may be based on the reference timing configuration used by the base station to determine the transmitted timing advance value.

In examples in which the the timing advance value received by the UE is equal to the timing advance value of a reference and the reference panel is determined based on which panel receives a downlink signal first (e.g., which may be equivalent to which panel has the relatively smaller timing advance value), the base station and the UE may determine that the panel 305-c is the reference panel. For example, the received timing advance value TA may be equal to 2*$t_0$ and the UE may determine that the first timing advance value for the panel 305-c is equal to 2*$t_0$ (e.g., the UE may determine that $\delta_0$=0 based on determining that the panel 305-c is the reference panel). As such, the UE may determine the total timing advance value for the panel 305-c based on determining $N_{TA0}$=$N_{TA}$+TA.

The UE may determine (e.g., derive) the second timing advance value for the panel 310-c based on the received timing advance value and a timing of the downlink signals received via the panel 305-c and the panel 310-c. In some examples, the UE may determine an offset $\delta_1$ between when a downlink signal is received via the panel 305-c and when a downlink signal is received via the panel 310-c. In some aspects, the UE may measure the offset $\delta_1$ between two downlink signals received at different panels of the UE that were transmitted from different TRPs associated with the base station at the same time (e.g., to achieve an accurate measure of the difference in timing advance between communications between the first TRP and the panel 305-c and communications between the second TRP and the panel 310-c). In some implementations, the UE may determine the offset $\delta_1$ to be proportional with the time difference of receiving two downlink signals received at different panels of the UE that were transmitted from different TRPs associated with the base station at the same time. For instance, $\delta_1$=2*($t_1$−$t_0$). Accordingly, the UE may determine the total timing advance value for the panel 310-c based on determining $N_{TA1}$=$N_{TA}$+TA+$\delta_1$.

In examples in which the timing advance value received by the UE is equal to the timing advance value of a reference panel and the reference panel is determined based on which panel has the lower panel ID, the base station and the UE may determine that the panel 305-c is the reference panel (e.g., the panel 305-c may be associated with a lower panel ID than the panel 310-c). For example, the received timing advance value TA may be equal to 2*$t_0$ and the UE may determine that the first timing advance value for the panel 305-c is equal to 2*$t_0$ (e.g., the UE may determine that $\delta_0$=0 based on determining that the panel 305-c is the reference panel). As such, the UE may determine the total timing advance value for the panel 305-c based on determining $N_{TA0}$=$N_{TA}$+TA.

The UE may determine (e.g., derive) the second timing advance value for the panel 310-c based on the received timing advance value and the timing of the downlink signals received via the panel 305-c and the panel 310-c. For example, the UE may determine an offset $\delta_1$ between when a downlink signal is received via the panel 305-c and when a downlink signal is received via the panel 310-c. In some aspects, the UE may measure the offset $\delta_1$ based on the time difference between two downlink signals received at different panels of the UE that were transmitted from different TRPs associated with the base station at the same time. In some implementations, the UE may determine the offset $\delta_1$ to be proportional with the time difference between receiving the first downlink signal at the reference panel (e.g., panel 305-c) of the UE and receiving the downlink downlink signal at the other panel (e.g., panel 310-c) of the UE that were transmitted from different TRPs associated with the base station at the same time. For instance, $\delta_1=2*(t_1-t_0)$. Accordingly, the UE may determine the total timing advance value for the panel 310-c based on determining $N_{TA1}=N_{TA}+TA+\delta_1$.

In examples in which the received timing advance value is equal to an average of the first timing advance value for the panel 305-c and the second timing advance value for the panel 310-c (e.g., $TA=(2*t_0+2*t_1)/2=t_0+t_1$), the UE may derive both the first timing advance value and the second timing advance value. For example, the UE may determine a first offset $\delta_0$ for the panel 305-c and a second offset $\delta_1$ for the panel 310-c. In some examples, the UE may determine the first offset $\delta_0$ based on a first difference between when a first downlink signal is received via panel 305-c and when a second downlink signal is received via panel 310-b and may determine the second offset $\delta_1$ based on a second difference between when the first downlink signal is received via panel 305-c and when the second downlink signal is received via panel 310-c. In some aspects, for example, the first difference may be proportional with the time difference between receiving the first downlink signal at panel 305-c of the UE and receiving the second downlink signal at panel 310-c of the UE that were transmitted from different TRPs associated with the base station at the same time. For example, the second difference may be proportional with the time difference between receiving the second downlink signal at panel 310-c of the UE and receiving the first downlink signal at panel 305-c of the UE that were transmitted from different TRPs associated with the base station at the same time. For instance, the first difference may refer to $t_0-t_1$ and the second difference may refer to $t_1-t_0$. Accordingly, $\delta_0=t_0-t_1$ and $\delta_1=t_1-t_0$. The UE may determine the first timing advance value for the panel 305-c based on the received timing advance value and the first offset and may determine the second timing advance value for the panel 310-c based on the received timing advance value and the second offset. For example, the first timing advance value may be equal to the $TA+(t_0-t_1)$ and the second timing advance value may be equal to $TA+(t_1-t_0)$. Accordingly, the UE may determine the total timing advance value for the panel 305-c based on determining $N_{TA0}=N_{TA}+TA+(t_0-t_1)$ and may determine the total timing advance value for the panel 310-c based on determining $N_{TA1}=N_{TA}+TA+(t_1-t_0)$.

As such, the UE may determine the first timing advance value for a panel 305 and the second timing advance value for a panel 310 and the UE may apply the determined timing advance values to communication between the first TRP associated with the base station and the panel 305 and to communication between the second TRP associated with the base station and the panel 310, respectively. As such, the base station may receive uplink signals from the UE better aligned with downlink frames maintained at the base station, which may increase the reliability of communications between the base station and the UE. Although described herein in the context of two panels (e.g., the panel 305 and the panel 310), the described techniques may apply to any number of panels. For example, the UE may receive a timing advance value from the base station and may determine any number of timing advance values for any number of panels of the UE based on the received timing advance value and a timing of downlink signals received at the different panels of the UE.

Figure 4:
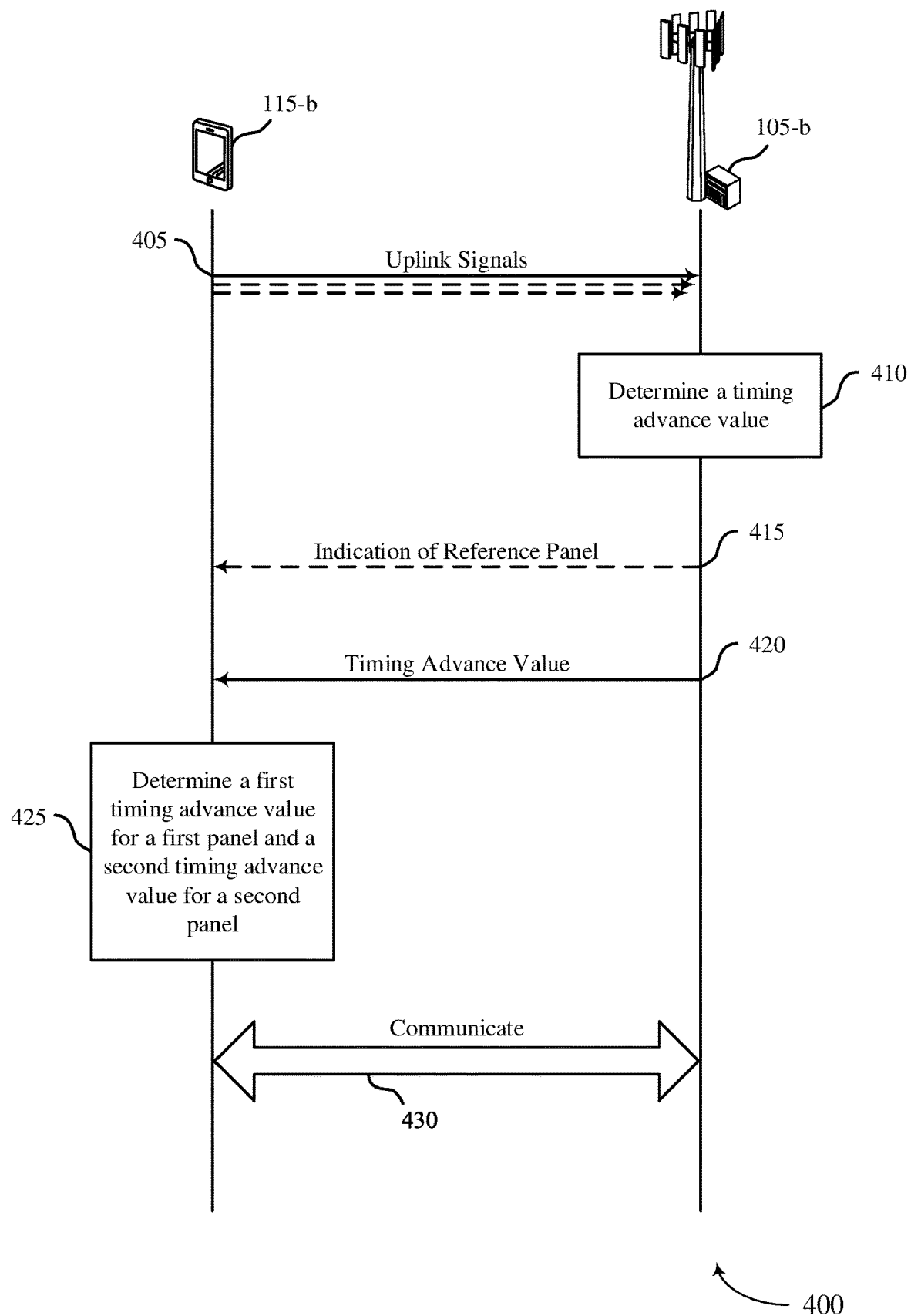
FIG. 4 illustrates an example of a process flow that supports timing advance indication for multi-panel uplink transmission in accordance with aspects of the present disclosure.

FIG. 4 illustrates an example of a process flow 400 that supports timing advance indication for multi-panel uplink transmission in accordance with aspects of the present disclosure. In some examples, the process flow 400 may implement aspects of the wireless communications system 100 and the wireless communication system 200. The process flow 400 may illustrate communication between a base station 105-b and a UE 115-b, which may be examples of corresponding devices as described herein. In some implementations, the UE 115-b may receive a timing advance value from the base station 105-b and may derive a timing advance value for each panel of the UE 115-b based on the received timing advance value and a timing of downlink signals received at different panels of the UE 115-b.

At 405, the UE 115-a may transmit one or more uplink signals to the base station 105-b. For example, the UE 115-a may transmit one or more transmissions from at least one of the multiple panels of the UE 115-b. In some aspects, the UE 115-a may transmit a first uplink signal from a first panel of the UE 115-b to a first TRP associated with the base station 105-b and a second uplink signal from a second panel of the UE 115-b to a second TRP associated with the base station 105-b.

At 410, the base station 105-b may determine a timing advance value for a serving cell configured for multi-panel communications based on the received one or more uplink signals (e.g., the one or more transmissions) from the UE 115-b and a reference timing configuration for the serving cell for the UE 115-b. The reference timing configuration may indicate that the base station 105-b will determine the timing advance value such that the timing advance value is equal to a timing advance value of a reference panel of the UE 115-b or equal to an average of the timing advance values for the panels of the UE 115-b, as described in more detail herein, including with reference to FIGS. 2 and 3.

At 415, the base station 105-b may, in some implementations, transmit an indication of the reference panel to the UE 115-b. For example, the base station 105-b may transmit an indication that the first panel of the UE 115-b is the reference panel. The base station 105-b may transmit the indication of the reference panel to the UE 115-b via RRC signaling, a MAC-CE, or in an indication in DCI.

At 420, the base station 105-b may transmit the timing advance value to the UE 115-b. The timing advance value may be a timing advance value for the serving cell configured for multi-panel communications.

At 425, the UE 115-b may determine a first timing advance value for the first panel and a second timing advance value for the second panel based on the received timing advance value and a timing of at least one of a first downlink signal received via the first panel or a second downlink signal received via the second panel. In some examples, the UE 115-b may determine the first timing advance value and the second timing advance value based on the reference timing configuration. For example, the UE 115-b may identify a method or algorithm that the UE 115-b may use to determine the first timing advance value and the second timing advance value based on the reference timing configuration.

In some implementations, the received timing advance value may be equal to a timing advance value for a reference panel of the UE 115-b and the UE 115-b may determine the first timing advance value and the second timing advance value based on determining the reference panel. In some examples, the UE 115-*b* may determine the reference panel of the UE 115-*b* based on the signaling from the base station 105-*b* at 415. In some other examples, the UE 115-*b* may determine which panel is associated with the lower panel ID. For example, the UE 115-*b* may determine that the first panel is associated with a lower panel ID and may determine that the first panel is the reference panel based on the first panel being associated with the lower panel ID. In some other examples, the UE 115-*b* may determine the reference panel based on which panel receives a downlink signal first or which panel receives a downlink signal last. For example, the UE 115-*b* may receive the first downlink signal via the first panel after receiving the second downlink signal via the second panel and the UE 115-*b* may determine that the first panel is the reference panel based on receiving the first downlink signal after the second downlink signal. Alternatively, the UE 115-*b* may receive the first downlink signal via the first panel prior to receiving the second downlink signal via the second panel and the UE 115-*b* may determine that the first panel is the reference panel based on receiving the first downlink signal prior to the second downlink signal. Upon determining the reference panel of the UE 115-*b* (e.g., upon determining that the first panel is the reference panel), the UE 115-*b* may derive the timing advance value for each remaining panel (e.g., the second panel) based on determining an offset from the received timing advance value based on the timing of the downlink signals received via the first panel and the second panel of the UE 115-*b*.

In some other implementations, the received timing advance value may be equal to an average of the first timing advance value and the second timing advance value. In such implementations, the UE 115-*b* may derive the first timing advance value for the first panel and the second timing advance value for the second panel based on determining a first offset associated with the first panel and a second offset associated with the second panel based on downlink signals received via the first panel and the second panel of the UE 115-*b*. Additional details and examples relating to determining the first timing advance value for the first panel and the second timing advance value for the second panel are described herein, including with reference to FIG. 3.

At 430, the UE 115-*b* may communicate with one or more TRPs associated with the base station 105-*b* based on the first timing advance value for the first panel and the second timing advance value for the second panel. For example, the UE 115-*b* may apply the first timing advance value to communication (e.g., uplink signaling) between the first TRP associated with the base station 105-*b* and the first panel of the UE 115-*b* and may apply the second timing advance value to communications (e.g., uplink signaling) between the second TRP associated with the base station 105-*b* and the second panel of the UE 115-*b*.

Figure 5:
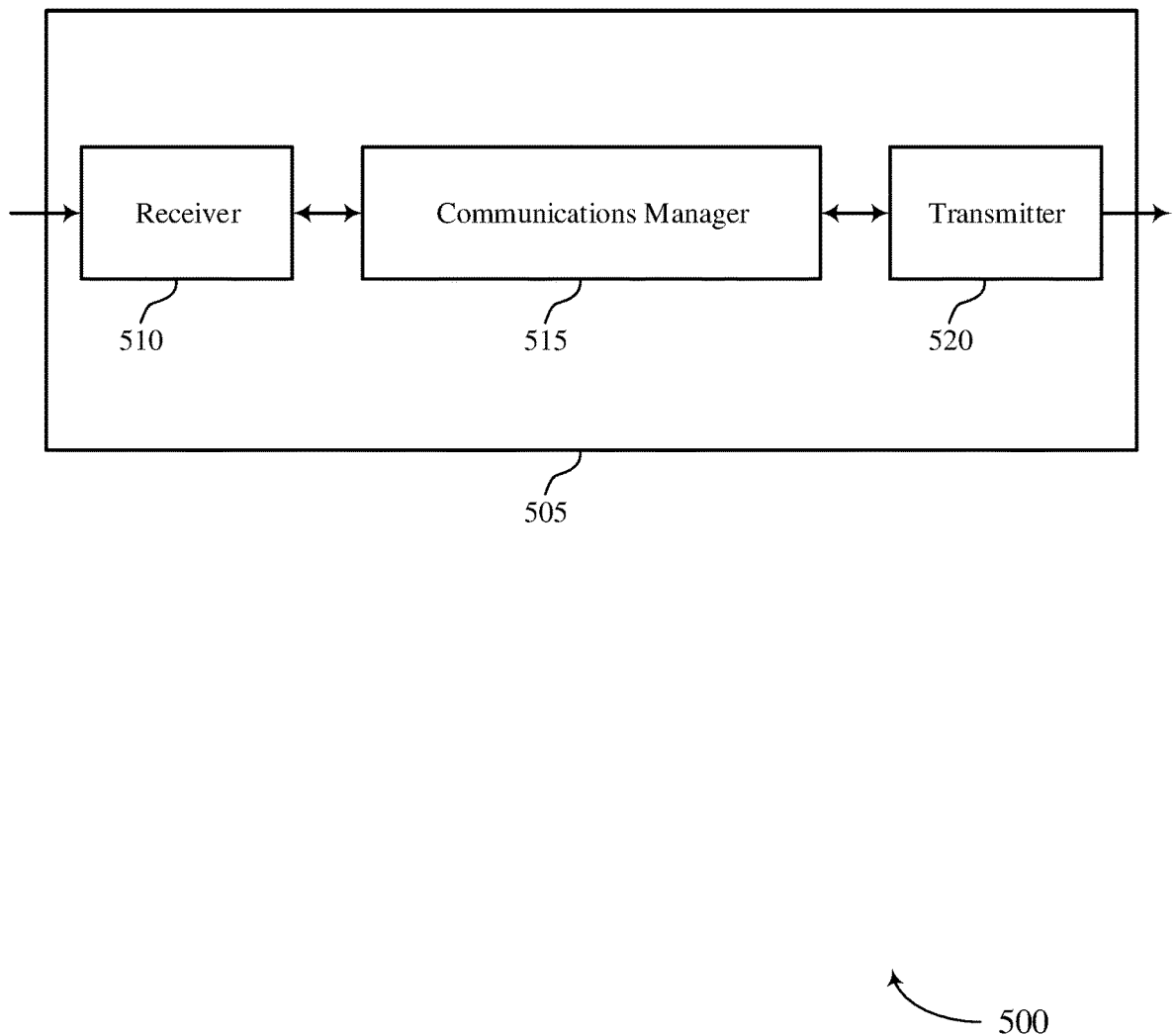
FIGS. 5 and 6 show block diagrams of devices that support timing advance indication for multi-panel uplink transmission in accordance with aspects of the present disclosure.

FIG. 5 shows a block diagram 500 of a device 505 that supports timing advance indication for multi-panel uplink transmission in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses). For example, the receive 510 may communicate with the communications manager 515 via a first link, which may be an example a wired link, a wireless link, or any other link that couples the receiver 510 and the communications manager 515. In some examples, the receiver 510 may send a received timing advance value to the communications manager 515 via the first link. The communications manager 515 may communicate with the transmitter 520 via second a link, which may be also an example of a wired link, a wireless link, or any other link that couples the communications manager 515 and the transmitter 520. In some examples, the communications manager 515 may send information relating to uplink signaling and timing advance values to the transmitter 520 via the second link.

The receiver 510 may receive information such as packets, user data, or control information associated with various information channels (e.g., control channels, data channels, and information related to timing advance indication for multi-panel uplink transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a timing advance value for a serving cell configured for multi-panel communications, determine a first timing advance value for a first panel and a second timing advance value for a second panel based on the received timing advance value and a timing of at least one of a first downlink signal received via the first panel or a second downlink signal received via the second panel, and communicate with one or more TRPs associated with the base station based on the first timing advance value for the first panel and the second timing advance value for the second panel. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. In some implementations of the present disclosure, the communications manager 515 may derive multiple timing advance values for multiple panels of the device 505 based on receiving a single timing advance value from a base station. Based on receiving a single timing advance value, the device 505 may monitor fewer resources for signaling from the base station, which may enable the device 505 to power down one or more processing components of the device 505 associated with receiving signaling from the base station for longer durations or to use resources that would have otherwise been used to receive control signaling from the base station to communicate data with the base station. As such, the device 505 may improve power savings and increase the battery life of the device 505 or improve the spectral efficiency of the communication link between the device 505 and the base station, or both.

Figure 6:
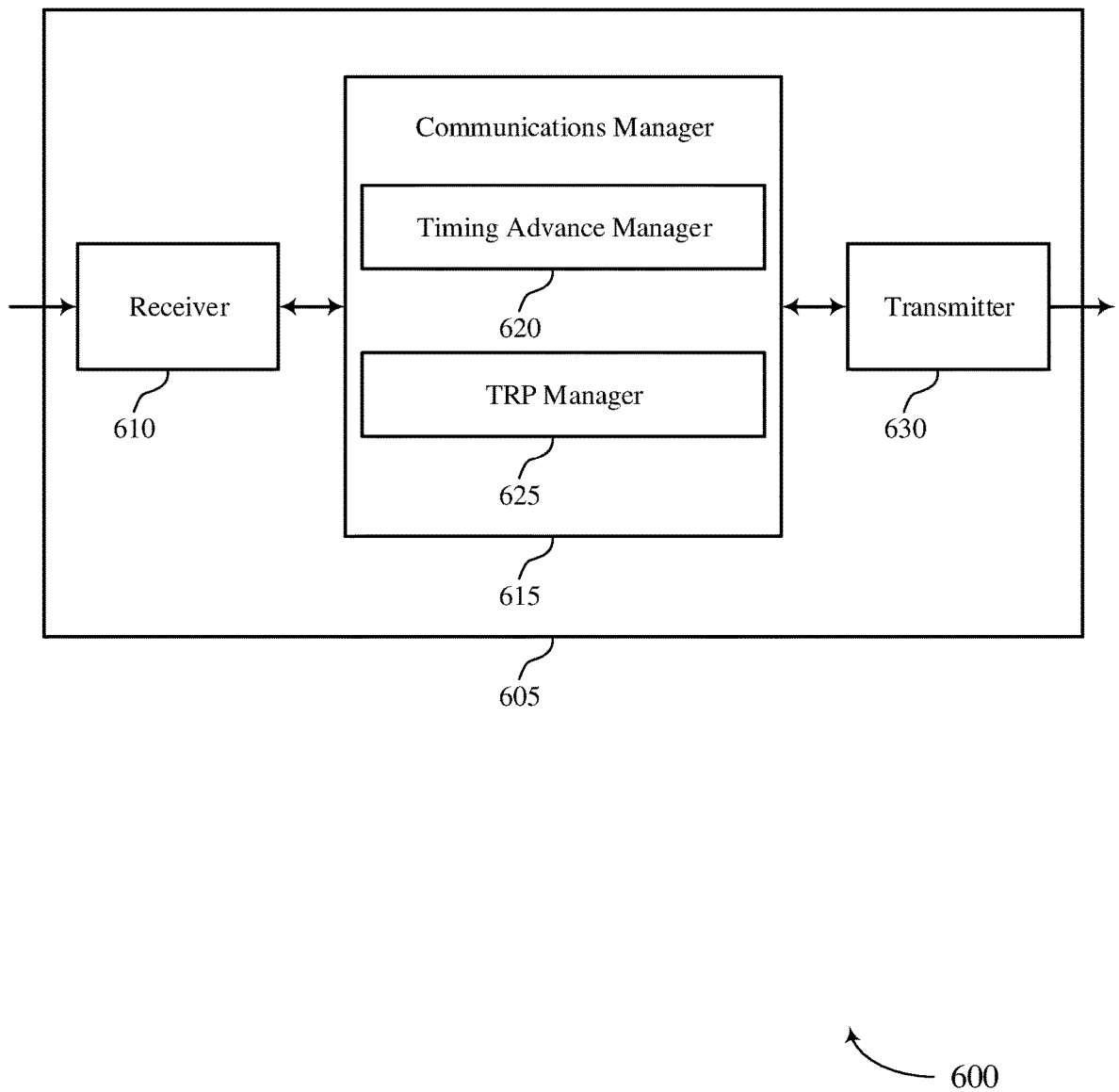

FIG. 6 shows a block diagram 600 of a device 605 that supports timing advance indication for multi-panel uplink transmission in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to timing advance indication for multi-panel uplink transmission, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a timing advance manager 620 and a TRP manager 625. The communications manager 615 may be an example of aspects of the communications manager 810 described herein.

The timing advance manager 620 may receive, from a base station, a timing advance value for a serving cell configured for multi-panel communications and determine a first timing advance value for a first panel and a second timing advance value for a second panel based on the received timing advance value and a timing of at least one of a first downlink signal received via the first panel or a second downlink signal received via the second panel. The TRP manager 625 may communicate with one or more TRPs associated with the base station based on the first timing advance value for the first panel and the second timing advance value for the second panel.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
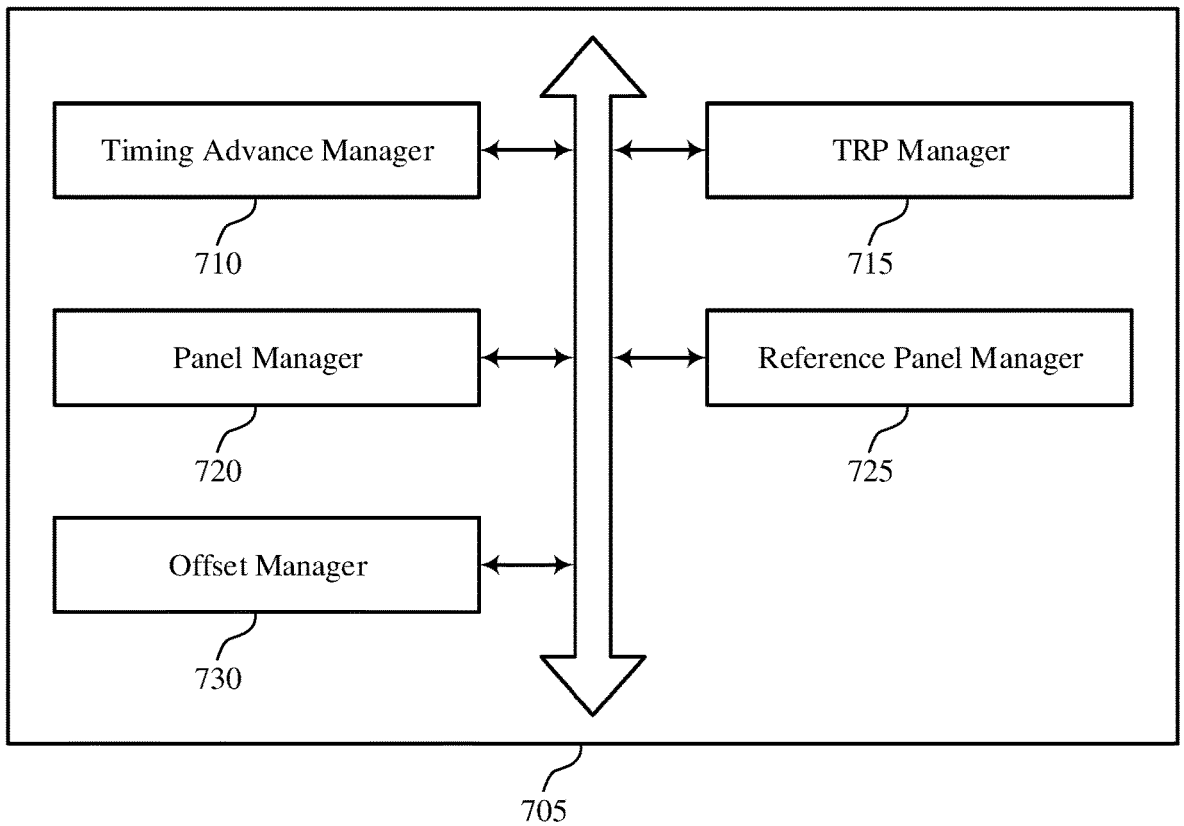
FIG. 7 shows a block diagram of a communications manager that supports timing advance indication for multi-panel uplink transmission in accordance with aspects of the present disclosure.

FIG. 7 shows a block diagram 700 of a communications manager 705 that supports timing advance indication for multi-panel uplink transmission in accordance with aspects of the present disclosure. The communications manager 705 may be an example of aspects of a communications manager 515, a communications manager 615, or a communications manager 810 described herein. The communications manager 705 may include a timing advance manager 710, a TRP manager 715, a panel manager 720, a reference panel manager 725, and an offset manager 730. Each of these modules may communicate, directly or indirectly, with one another (e.g., via one or more buses).

The timing advance manager 710 may receive, from a base station, a timing advance value for a serving cell configured for multi-panel communications. In some examples, the timing advance manager 710 may determine a first timing advance value for a first panel and a second timing advance value for a second panel based on the received timing advance value and a timing of at least one of a first downlink signal received via the first panel or a second downlink signal received via the second panel.

In some examples, the timing advance manager 710 may determine the second timing advance value for the second panel based on the received timing advance value and the offset. In some examples, the timing advance manager 710 may determine the first timing advance value for the first panel based on the received timing advance value and the first offset. In some examples, the timing advance manager 710 may determine the second timing advance value for the second panel based on the received timing advance value and the second offset.

The TRP manager 715 may communicate with one or more TRPs associated with the base station based on the first timing advance value for the first panel and the second timing advance value for the second panel.

The panel manager 720 may determine that the first panel is a reference panel, where applying the timing advance value to the first panel is based on determining that the first panel is the reference panel.

The reference panel manager 725 may receive, from the base station, an indication that the first panel is the reference panel. In some examples, the reference panel manager 725 may receive the first downlink signal via the first panel after receiving the second downlink signal via the second panel, where determining that the first panel is the reference panel is based on receiving the first downlink signal via the first panel after receiving the second downlink signal via the second panel. In some examples, the reference panel manager 725 may receive the first downlink signal via the first panel prior to receiving the second downlink signal via the second panel, where determining that the first panel is the reference panel is based on receiving the first downlink signal via the first panel prior to receiving the second downlink signal via the second panel.

The offset manager 730 may determine an offset based on a difference between when the first downlink signal is received by the first panel and when the second downlink signal is received by the second panel. In some examples, the offset manager 730 may determine a first offset and a second offset based on a difference between when the first downlink signal is received by the first panel and when the second downlink signal is received by the second panel.

In some examples, the offset manager 730 may determine the first offset based on a first difference between when the first downlink signal is received by the first panel and when the second downlink signal is received by the second panel. In some examples, the offset manager 730 may determine the second offset based on a second difference between when the first downlink signal is received by the first panel and when the second downlink signal is received by the second panel.

Figure 8:
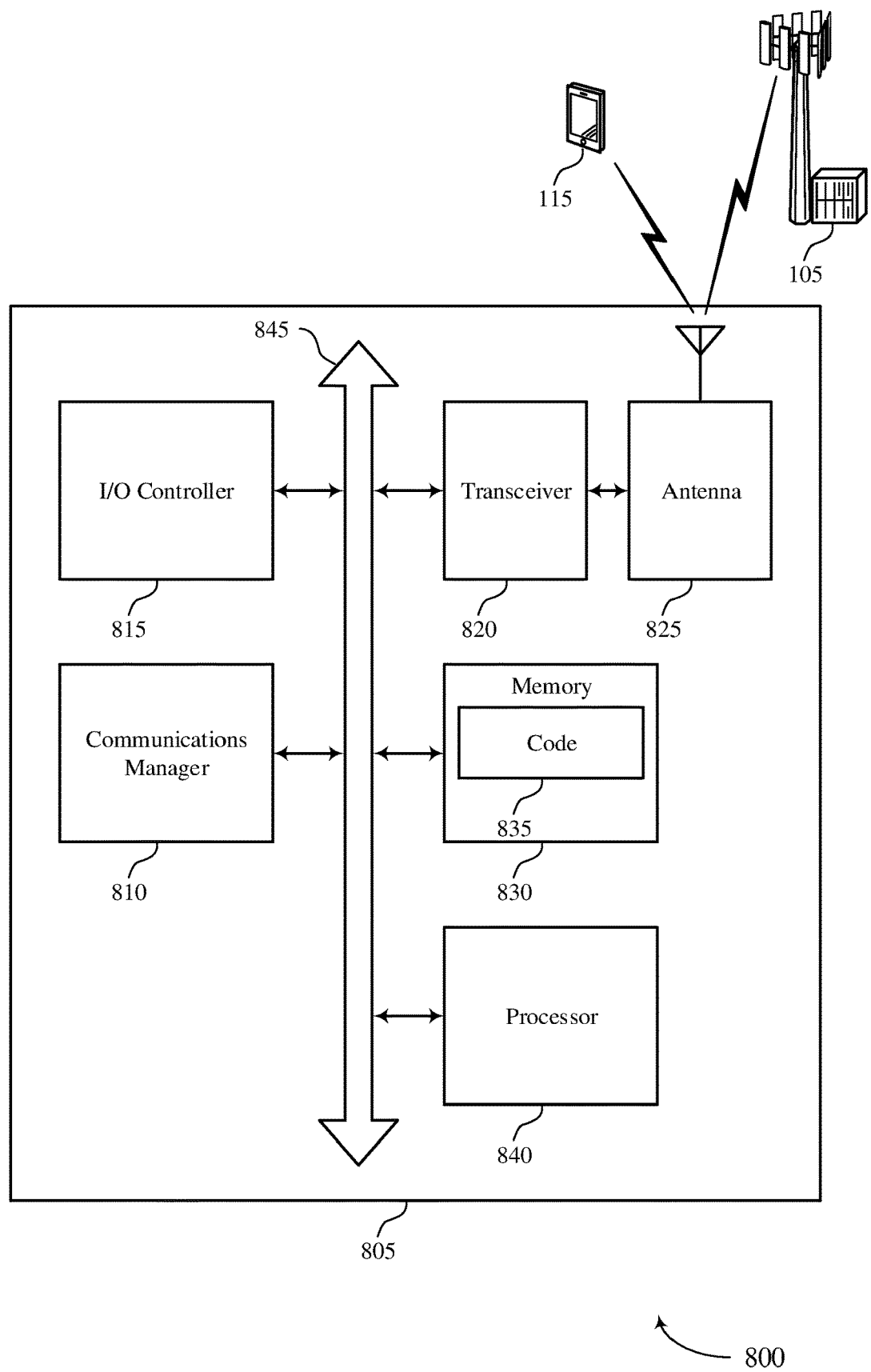
FIG. 8 shows a diagram of a system including a device that supports timing advance indication for multi-panel uplink transmission in accordance with aspects of the present disclosure.

FIG. 8 shows a diagram of a system 800 including a device 805 that supports timing advance indication for multi-panel uplink transmission in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a timing advance value for a serving cell configured for multi-panel communications, determine a first timing advance value for a first panel and a second timing advance value for a second panel based on the received timing advance value and a timing of at least one of a first downlink signal received via the first panel or a second downlink signal received via the second panel, and communicate with one or more TRPs associated with the base station based on the first timing advance value for the first panel and the second timing advance value for the second panel.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting timing advance indication for multi-panel uplink transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
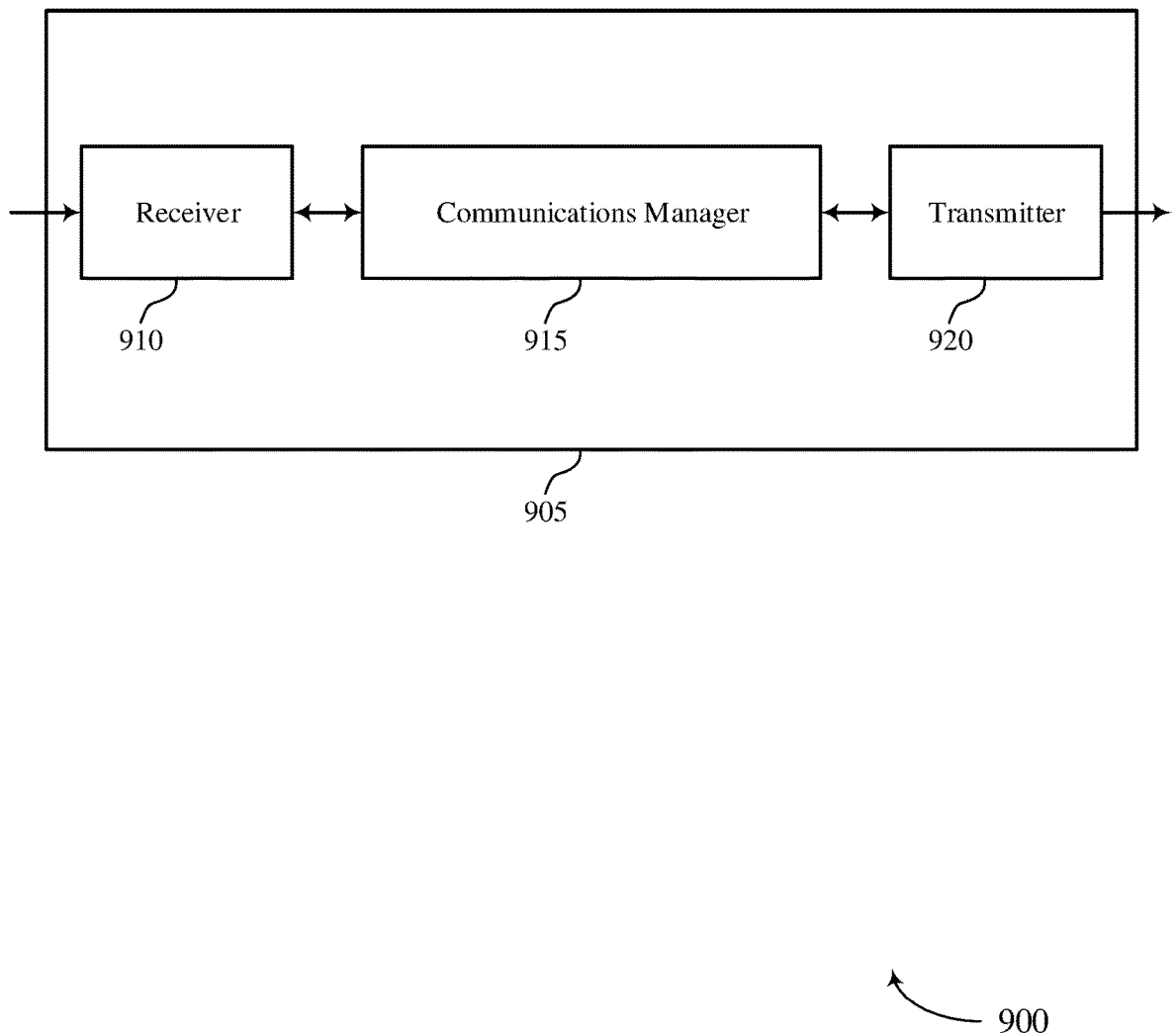
FIGS. 9 and 10 show block diagrams of devices that support timing advance indication for multi-panel uplink transmission in accordance with aspects of the present disclosure.

FIG. 9 shows a block diagram 900 of a device 905 that supports timing advance indication for multi-panel uplink transmission in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to timing advance indication for multi-panel uplink transmission, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, one or more transmissions from at least one of multiple panels of the UE, determine a timing advance value for a serving cell configured for multi-panel communications based at least in part the received one or more transmissions and a reference timing configuration for the serving cell for the UE, transmit, to the UE, the timing advance value, and communicate with the UE via one or more TRPs associated with the base station. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

As described herein, the device 905 may determine a timing advance for each panel of a UE that the UE uses to communicate with a TRP associated with the device 905 and may signal a single timing advance value to the UE. As such, the device 905 may reduce the amount of resources the device 905 may use for control signaling to the UE, which may improve the spectral efficiency of the communication link between the device 905 and the UE. Further, the device 905, based on reducing signaling to the UE, may also reduce the interference that may potentially be generated as a result of signaling between the device 905 and the UE, which may increase the likelihood for successful wireless communications among other devices in the cell and increase the capacity of the cell.

Figure 10:
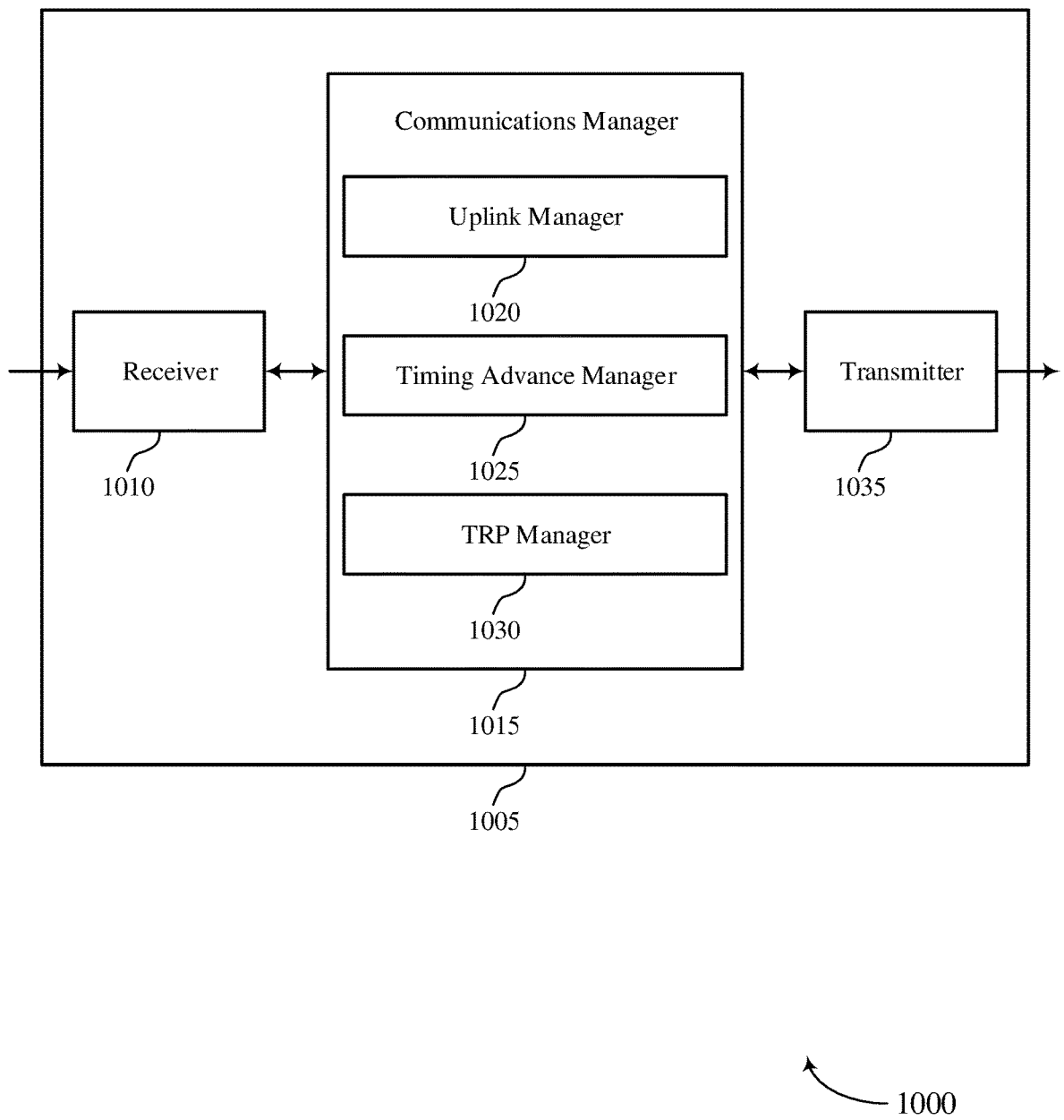

FIG. 10 shows a block diagram 1000 of a device 1005 that supports timing advance indication for multi-panel uplink transmission in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to timing advance indication for multi-panel uplink transmission, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink manager 1020, a timing advance manager 1025, and a TRP manager 1030. The communications manager 1015 may be an example of aspects of the communications manager 1210 described herein.

The uplink manager 1020 may receive, from a UE, one or more transmissions from at least one of multiple panels of the UE. The timing advance manager 1025 may determine a timing advance value for a serving cell configured for multi-panel communications based at least in part the received one or more transmissions and a reference timing configuration for the serving cell for the UE and transmit, to the UE, the timing advance value. The TRP manager 1030 may communicate with the UE via one or more TRPs associated with the base station.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
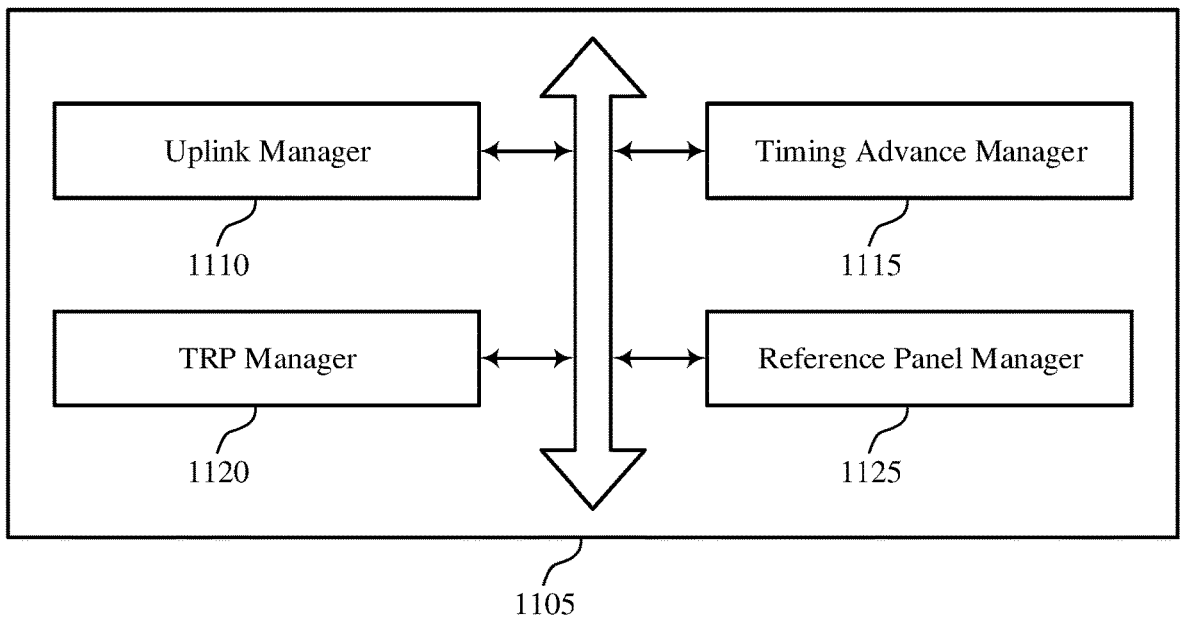
FIG. 11 shows a block diagram of a communications manager that supports timing advance indication for multi-panel uplink transmission in accordance with aspects of the present disclosure.

FIG. 11 shows a block diagram 1100 of a communications manager 1105 that supports timing advance indication for multi-panel uplink transmission in accordance with aspects of the present disclosure. The communications manager 1105 may be an example of aspects of a communications manager 915, a communications manager 1015, or a communications manager 1210 described herein. The communications manager 1105 may include an uplink manager 1110, a timing advance manager 1115, a TRP manager 1120, and a reference panel manager 1125. Each of these modules may communicate, directly or indirectly, with one another (e.g., via one or more buses).

The uplink manager 1110 may receive, from a UE, one or more transmissions from at least one of multiple panels of the UE.

The timing advance manager 1115 may determine a timing advance value for a serving cell configured for multi-panel communications based at least in part the received one or more transmissions and a reference timing configuration for the serving cell for the UE. In some examples, the timing advance manager 1115 may transmit, to the UE, the timing advance value.

In some examples, the timing advance manager 1115 may determine that the first panel is associated with a larger timing advance value than the second panel, where determining that the first panel is the reference panel is based on determining that the first panel is associated with the larger timing advance. In some examples, the timing advance manager 1115 may determine that the first panel is associated with a smaller timing advance value than the second panel, where determining that the first panel is the reference panel is based on determining that the first panel is associated with the smaller timing advance.

The TRP manager 1120 may communicate with the UE via one or more TRPs associated with the base station.

The reference panel manager 1125 may determine that the first panel is a reference panel based on the reference timing configuration, where the transmitted timing advance value is equal to the first timing advance value for the first panel based on determining that the first panel is the reference panel. In some examples, the reference panel manager 1125 may transmit, to the UE, an indication that the first panel is the reference panel.

Figure 12:
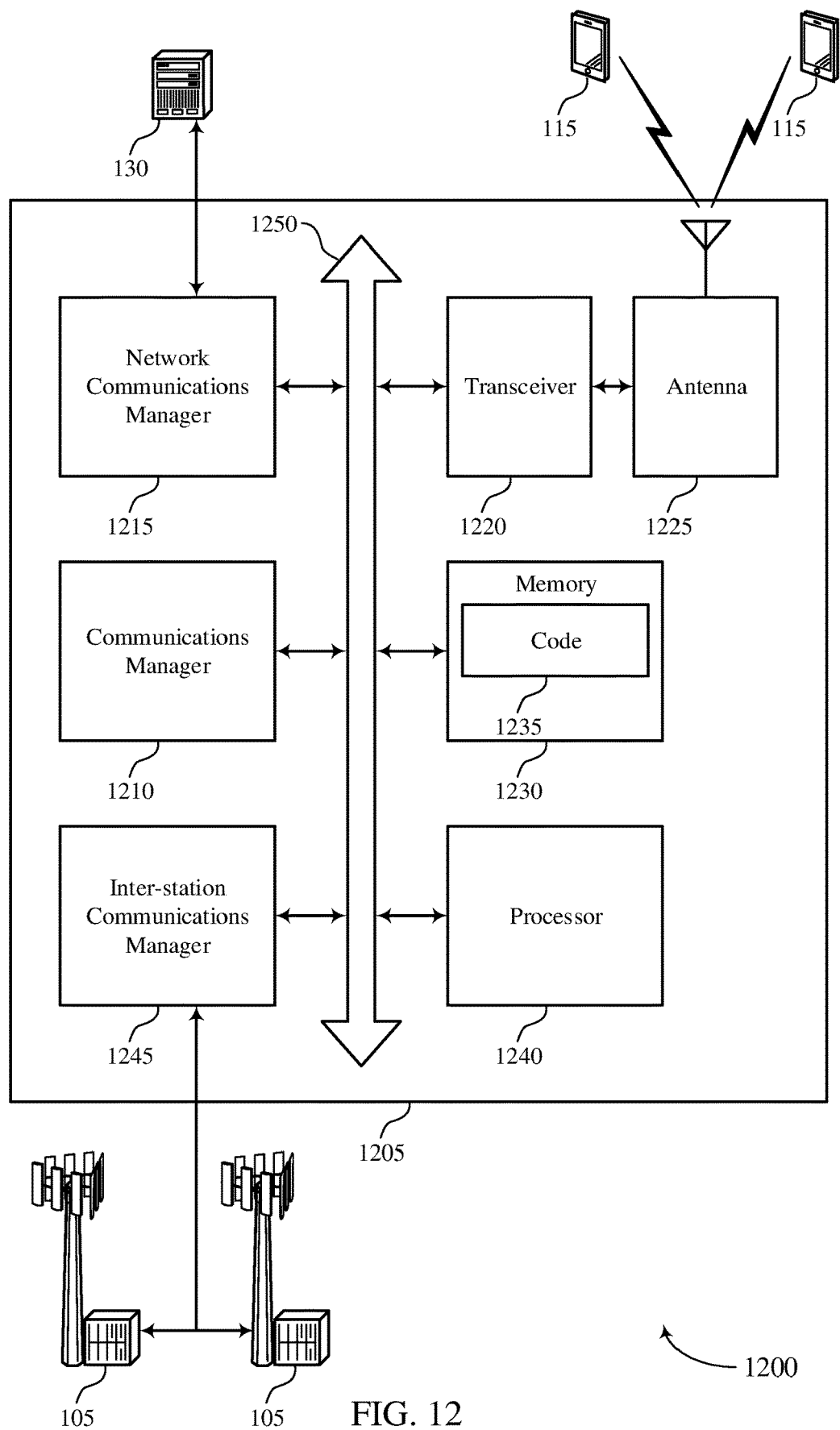
FIG. 12 shows a diagram of a system including a device that supports timing advance indication for multi-panel uplink transmission in accordance with aspects of the present disclosure.

FIG. 12 shows a diagram of a system 1200 including a device 1205 that supports timing advance indication for multi-panel uplink transmission in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, one or more transmissions from at least one of multiple panels of the UE, determine a timing advance value for a serving cell configured for multi-panel communications based at least in part the received one or more transmissions and a reference timing configuration for the serving cell for the UE, transmit, to the UE, the timing advance value, and communicate with the UE via one or more TRPs associated with the base station.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting timing advance indication for multi-panel uplink transmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
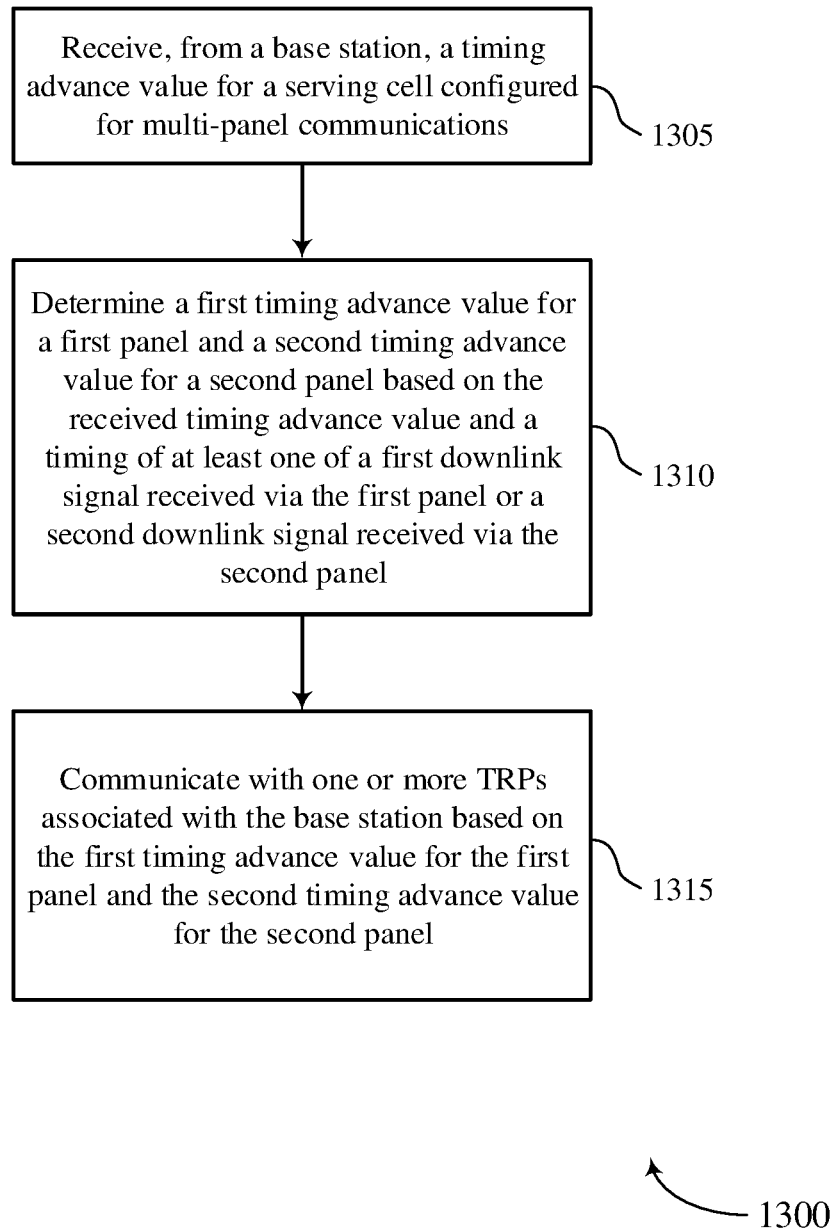
FIGS. 13 and 14 show flowcharts illustrating methods that support timing advance indication for multi-panel uplink transmission in accordance with aspects of the present disclosure.

FIG. 13 shows a flowchart illustrating a method 1300 that supports timing advance indication for multi-panel uplink transmission in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a timing advance value for a serving cell configured for multi-panel communications. To receive the timing advance value, the UE may identify a resource allocation (e.g., time and frequency resources) over which the base station may transmit the timing advance value, demodulate the transmission over the resource allocation, and decode the demodulated transmission to obtain bits that indicate the timing advance value. The operations of 1305 may be performed according to the methods described herein. In some examples, aspects of the operations of 1305 may be performed by a timing advance manager as described with reference to FIGS. 5 through 8.

In some examples, the UE may receive the timing advance value as part of a timing advance configuration for multi-panel communication for the UE. As described herein, signaling a single timing advance value to configure a timing advance for multiple panels of the UE may reduce signaling overhead and improve the spectral efficiency of a communication link between the base station and the UE (e.g., via one or more TRPs).

At 1310, the UE may determine a first timing advance value for a first panel and a second timing advance value for a second panel based on the received timing advance value and a timing of at least one of a first downlink signal received via the first panel or a second downlink signal received via the second panel. The UE may use a method or an algorithm for determining the first timing advance for the first panel and the second timing advance for the second panel based on a reference timing configuration, as described in more detail with reference to FIG. 3. For example, the received timing advance value may be equal to the timing advance value of a reference panel of the UE or may be equal to an average of the timing advances for each panel of UE, among other examples. The operations of 1310 may be performed according to the methods described herein. In some examples, aspects of the operations of 1310 may be performed by a timing advance manager as described with reference to FIGS. 5 through 8.

At 1315, the UE may communicate with one or more TRPs associated with the base station based on the first timing advance value for the first panel and the second timing advance value for the second panel. For example, the UE may identify a resource allocation (e.g., time and frequency resources) for transmitting or receiving, or both, with the one or more TRPs. Such communication may include encoding, modulating, and transmitting signals to the one or more TRPs or receiving, demodulating, and decoding signals from the one or more TRPs. In some examples, the UE may apply the first timing advance value to communication (e.g., uplink signaling) from the first panel to a first TRP associated with the base station and may apply the second timing advance value to communication (e.g., uplink signaling) from the second panel to a second TRP associated with the base station. The operations of 1315 may be performed according to the methods described herein. In some examples, aspects of the operations of 1315 may be performed by a TRP manager as described with reference to FIGS. 5 through 8.

Figure 14:
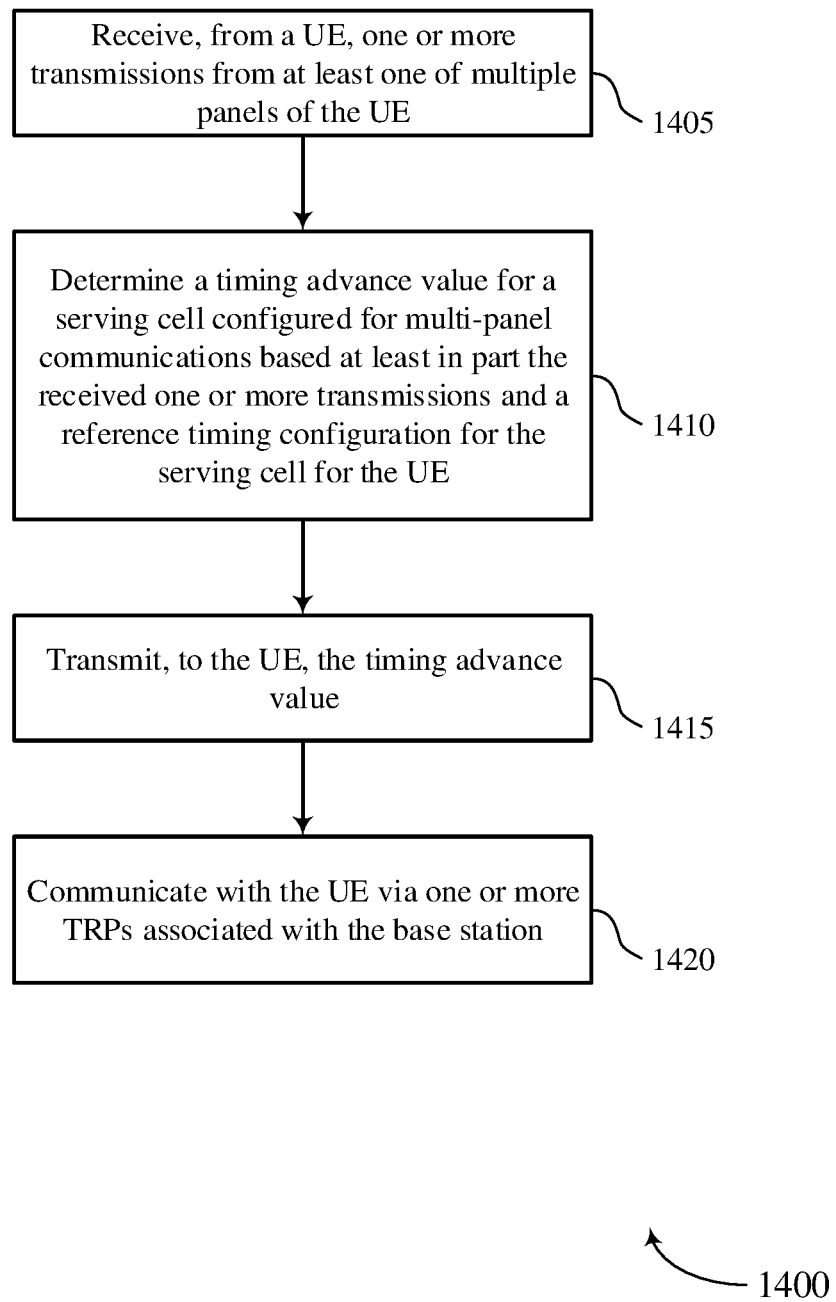

FIG. 14 shows a flowchart illustrating a method 1400 that supports timing advance indication for multi-panel uplink transmission in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may receive, from a UE, one or more transmissions from at least one of multiple panels of the UE. To receive the one or more transmissions from the at least one of the multiple panels of the UE, the base station may identify a resource allocation (e.g., time and frequency resources) over which the UE may transmit, demodulate the transmission over the resource allocation, and decode the demodulated transmission to obtain bits that indicate the transmission. In some examples, the one or more transmissions from the UE may refer to uplink signaling that the base station may measure to determine the timing advance value for each panel of the UE that the UE uses to communicate with TRPs associated with the base station. The operations of 1405 may be performed according to the methods described herein. In some examples, aspects of the operations of 1405 may be performed by an uplink manager as described with reference to FIGS. 9 through 12.

At 1410, the base station may determine a timing advance value for a serving cell configured for multi-panel communications based at least in part the received one or more transmissions and a reference timing configuration for the serving cell for the UE. The base station may use a method or an algorithm for determining the timing advance value based on a reference timing configuration, as described in more detail with reference to FIG. 3. In some examples, the base station may set the timing advance value equal to the timing advance value of a reference panel of the UE. In some other examples, the base station may set the timing advance value equal to an average of the timing advance values for the panels of the UE. The operations of 1410 may be performed according to the methods described herein. In some examples, aspects of the operations of 1410 may be performed by a timing advance manager as described with reference to FIGS. 9 through 12.

At 1415, the base station may transmit, to the UE, the timing advance value. To transmit the timing advance value, the base station may identify a resource allocation (e.g., time and frequency resources) over which the base station may transmit the timing advance value, encode the timing advance value to determine bits that indicate the timing advance value, and modulate the timing advance value over the resource allocation. The operations of 1415 may be performed according to the methods described herein. In some examples, aspects of the operations of 1415 may be performed by a timing advance manager as described with reference to FIGS. 9 through 12.

In some examples, the base station may transmit the timing advance value as part of a timing advance configuration for multi-panel communication for the UE. As described herein, signaling a single timing advance value to configure a timing advance for multiple panels of the UE may reduce signaling overhead and improve the spectral efficiency of a communication link between the base station and the UE (e.g., via one or more TRPs).

At 1420, the base station may communicate with the UE via one or more TRPs associated with the base station. For example, the base station may identify a resource allocation (e.g., time and frequency resources) for transmitting or receiving, or both, with the UE via the one or more TRPs. Such communication may include encoding, modulating, and transmitting signals to the UE via the one or more TRPs or receiving, demodulating, and decoding signals from UE via the one or more TRPs. In some examples, the base station may receive uplink signaling from the UE aligned in time with a downlink frame at the base station based on transmitting the timing advance value to the UE. The operations of 1420 may be performed according to the methods described herein. In some examples, aspects of the operations of 1420 may be performed by a TRP manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a timing advance value for a serving cell configured for multi-panel communications;
   determining a first timing advance value for a first panel and a second timing advance value for a second panel based at least in part on the received timing advance value and a timing of at least one of a first downlink signal received via the first panel or a second downlink signal received via the second panel; and
   communicating with one or more transmission and reception points associated with the base station based at least in part on the first timing advance value for the first panel and the second timing advance value for the second panel.

2. The method of claim 1, further comprising:
   determining that the first panel is a reference panel, wherein applying the timing advance value to the first panel is based at least in part on determining that the first panel is the reference panel.

3. The method of claim 2, further comprising:
   receiving, from the base station, an indication that the first panel is the reference panel.

4. The method of claim 3, wherein the indication is received via at least one of radio resource control (RRC) signaling, a medium access control (MAC) control element (CE), or downlink control information (DCI).

5. The method of claim 2, wherein the first panel is associated with a first panel identifier lower than a second panel identifier associated with the second panel, and wherein determining that the first panel is the reference panel is based at least in part on the first panel identifier being lower than the second panel identifier.

6. The method of claim 2, further comprising:
   receiving the first downlink signal via the first panel after receiving the second downlink signal via the second panel, wherein determining that the first panel is the reference panel is based at least in part on receiving the first downlink signal via the first panel after receiving the second downlink signal via the second panel.

7. The method of claim 2, further comprising:
   receiving the first downlink signal via the first panel prior to receiving the second downlink signal via the second panel, wherein determining that the first panel is the reference panel is based at least in part on receiving the first downlink signal via the first panel prior to receiving the second downlink signal via the second panel.

8. The method of claim 1, wherein determining the second timing advance value for the second panel comprises:

determining an offset based at least in part on a difference between when the first downlink signal is received by the first panel and when the second downlink signal is received by the second panel; and
determining the second timing advance value for the second panel based at least in part on the received timing advance value and the offset.

9. The method of claim 1, wherein determining the first timing advance value for the first panel and the second timing advance value for the second panel comprises:
determining a first offset and a second offset based at least in part on a difference between when the first downlink signal is received by the first panel and when the second downlink signal is received by the second panel;
determining the first timing advance value for the first panel based at least in part on the received timing advance value and the first offset; and
determining the second timing advance value for the second panel based at least in part on the received timing advance value and the second offset.

10. The method of claim 9, wherein determining the first offset and the second offset comprises:
determining the first offset based at least in part on a first difference between when the first downlink signal is received by the first panel and when the second downlink signal is received by the second panel; and
determining the second offset based at least in part on a second difference between when the first downlink signal is received by the first panel and when the second downlink signal is received by the second panel.

11. An apparatus for wireless communications at a user equipment (UE), comprising:
at least one processor; and
at least one memory coupled with the at least one processor and storing instructions executable by the at least one processor to cause the apparatus to:
receive, from a base station, a timing advance value for a serving cell configured for multi-panel communications;
determine a first timing advance value for a first panel and a second timing advance value for a second panel based at least in part on the received timing advance value and a timing of at least one of a first downlink signal received via the first panel or a second downlink signal received via the second panel; and
communicate with one or more transmission and reception points associated with the base station based at least in part on the first timing advance value for the first panel and the second timing advance value for the second panel.

12. The apparatus of claim 11, wherein the instructions are further executable by the at least one processor to cause the apparatus to:
determine that the first panel is a reference panel, wherein applying the timing advance value to the first panel is based at least in part on determining that the first panel is the reference panel.

13. The apparatus of claim 12, wherein the instructions are further executable by the at least one processor to cause the apparatus to:
receive, from the base station, an indication that the first panel is the reference panel.

14. The apparatus of claim 13, wherein the indication is received via at least one of radio resource control (RRC) signaling, a medium access control (MAC) control element (CE), or downlink control information (DCI).

15. The apparatus of claim 12, wherein the first panel is associated with a first panel identifier lower than a second panel identifier associated with the second panel, and wherein determining that the first panel is the reference panel is based at least in part on the first panel identifier being lower than the second panel identifier.

16. The apparatus of claim 12, wherein the instructions are further executable by the at least one processor to cause the apparatus to:
receive the first downlink signal via the first panel after receiving the second downlink signal via the second panel, wherein determining that the first panel is the reference panel is based at least in part on receiving the first downlink signal via the first panel after receiving the second downlink signal via the second panel.

17. The apparatus of claim 12, wherein the instructions are further executable by the at least one processor to cause the apparatus to:
receive the first downlink signal via the first panel prior to receiving the second downlink signal via the second panel, wherein determining that the first panel is the reference panel is based at least in part on receiving the first downlink signal via the first panel prior to receiving the second downlink signal via the second panel.

18. The apparatus of claim 11, wherein the instructions to determine the second timing advance value for the second panel are executable by the at least one processor to cause the apparatus to:
determine an offset based at least in part on a difference between when the first downlink signal is received by the first panel and when the second downlink signal is received by the second panel; and
determine the second timing advance value for the second panel based at least in part on the received timing advance value and the offset.

19. The apparatus of claim 11, wherein the instructions to determine the first timing advance value for the first panel and the second timing advance value for the second panel are executable by the at least one processor to cause the apparatus to:
determine a first offset and a second offset based at least in part on a difference between when the first downlink signal is received by the first panel and when the second downlink signal is received by the second panel;
determine the first timing advance value for the first panel based at least in part on the received timing advance value and the first offset; and
determine the second timing advance value for the second panel based at least in part on the received timing advance value and the second offset.

20. The apparatus of claim 19, wherein the instructions to determine the first offset and the second offset are executable by the at least one processor to cause the apparatus to:
determine the first offset based at least in part on a first difference between when the first downlink signal is received by the first panel and when the second downlink signal is received by the second panel; and
determine the second offset based at least in part on a second difference between when the first downlink signal is received by the first panel and when the second downlink signal is received by the second panel.

21. An apparatus for wireless communications at a user equipment (UE), comprising:
means for receiving, from a base station, a timing advance value for a serving cell configured for multi-panel communications;

means for determining a first timing advance value for a first panel and a second timing advance value for a second panel based at least in part on the received timing advance value and a timing of at least one of a first downlink signal received via the first panel or a second downlink signal received via the second panel; and means for communicating with one or more transmission and reception points associated with the base station based at least in part on the first timing advance value for the first panel and the second timing advance value for the second panel.

22. The apparatus of claim 21, further comprising:
means for determining that the first panel is a reference panel, wherein applying the timing advance value to the first panel is based at least in part on determining that the first panel is the reference panel.

23. The apparatus of claim 22, further comprising:
means for receiving, from the base station, an indication that the first panel is the reference panel.

24. The apparatus of claim 23, wherein the indication is received via at least one of radio resource control (RRC) signaling, a medium access control (MAC) control element (CE), or downlink control information (DCI).

25. The apparatus of claim 22, wherein the first panel is associated with a first panel identifier lower than a second panel identifier associated with the second panel, and wherein determining that the first panel is the reference panel is based at least in part on the first panel identifier being lower than the second panel identifier.

26. The apparatus of claim 22, further comprising:
means for receiving the first downlink signal via the first panel after receiving the second downlink signal via the second panel, wherein determining that the first panel is the reference panel is based at least in part on receiving the first downlink signal via the first panel after receiving the second downlink signal via the second panel.

27. The apparatus of claim 22, further comprising:
means for receiving the first downlink signal via the first panel prior to receiving the second downlink signal via the second panel, wherein determining that the first panel is the reference panel is based at least in part on receiving the first downlink signal via the first panel prior to receiving the second downlink signal via the second panel.

28. The apparatus of claim 21, wherein means for determining the second timing advance value for the second panel comprises:
means for determining an offset based at least in part on a difference between when the first downlink signal is received by the first panel and when the second downlink signal is received by the second panel; and
means for determining the second timing advance value for the second panel based at least in part on the received timing advance value and the offset.

29. The apparatus of claim 21, wherein means for determining the first timing advance value for the first panel and the second timing advance value for the second panel comprises:
means for determining a first offset and a second offset based at least in part on a difference between when the first downlink signal is received by the first panel and when the second downlink signal is received by the second panel;

means for determining the first timing advance value for the first panel based at least in part on the received timing advance value and the first offset; and
means for determining the second timing advance value for the second panel based at least in part on the received timing advance value and the second offset.

30. The apparatus of claim 29, wherein means for determining the first offset and the second offset comprises:
means for determining the first offset based at least in part on a first difference between when the first downlink signal is received by the first panel and when the second downlink signal is received by the second panel; and
means for determining the second offset based at least in part on a second difference between when the first downlink signal is received by the first panel and when the second downlink signal is received by the second panel.

31. A non-transitory computer-readable medium storing code for wireless communication, the code comprising instructions executable by at least one processor to:
receive, from a base station, a timing advance value for a serving cell configured for multi-panel communications;
determine a first timing advance value for a first panel and a second timing advance value for a second panel based at least in part on the received timing advance value and a timing of at least one of a first downlink signal received via the first panel or a second downlink signal received via the second panel; and
communicate with one or more transmission and reception points associated with the base station based at least in part on the first timing advance value for the first panel and the second timing advance value for the second panel.

32. The non-transitory computer-readable medium of claim 31, wherein the instructions are further executable by the at least one processor to:
determine that the first panel is a reference panel, wherein applying the timing advance value to the first panel is based at least in part on determining that the first panel is the reference panel.

33. The non-transitory computer-readable medium of claim 32, wherein the instructions are further executable by the at least one processor to:
receive, from the base station, an indication that the first panel is the reference panel.

34. The non-transitory computer-readable medium of claim 32, wherein the first panel is associated with a first panel identifier lower than a second panel identifier associated with the second panel, and wherein determining that the first panel is the reference panel is based at least in part on the first panel identifier being lower than the second panel identifier.

35. The non-transitory computer-readable medium of claim 32, wherein the instructions are further executable by the at least one processor to:
receive the first downlink signal via the first panel after receiving the second downlink signal via the second panel, wherein determining that the first panel is the reference panel is based at least in part on receiving the first downlink signal via the first panel after receiving the second downlink signal via the second panel.

* * * * *